(12) United States Patent
Wee et al.

(10) Patent No.: US 6,507,618 B1
(45) Date of Patent: Jan. 14, 2003

(54) COMPRESSED VIDEO SIGNAL INCLUDING INDEPENDENTLY CODED REGIONS

(75) Inventors: Susie J. Wee, San Carlos, CA (US); John G. Apostolopoulos, San Carlos, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/558,079

(22) Filed: Apr. 25, 2000

(51) Int. Cl.[7] .............................................. H04N 7/18
(52) U.S. Cl. ........................ 375/240.16; 375/240.16; 375/240.13
(58) Field of Search .................. 375/240.08–240.17

(56) References Cited

U.S. PATENT DOCUMENTS

| | | | | |
|---|---|---|---|---|
| 5,995,668 A | * | 11/1999 | Corset et al. | 375/240.16 |
| 6,014,173 A | * | 1/2000 | Miyamoto | 348/699 |
| 6,208,693 B1 | * | 3/2001 | Chen et al. | 375/240.24 |
| 6,233,356 B1 | * | 5/2001 | Haskell et al. | 348/408.1 |
| 6,259,828 B1 | * | 7/2001 | Crinon et al. | 348/584 |
| 6,275,533 B1 | * | 8/2001 | Nishi | 375/240.24 |

* cited by examiner

*Primary Examiner*—Andy Rao
(74) *Attorney, Agent, or Firm*—Marc P. Schuyler

(57) ABSTRACT

In a MPEG or other video system, regions of each frame may be independently coded for later, independent extraction directly from a compressed bit stream. An encoder/transcoder receives raw video, standard compressed video or compressed video already having independently coded regions ("ICRs") that are to be edited in some manner. A resultant signal may be used downstream for logo insertion or other video editing or processing without having to completely decode the entirety of each frame of a video sequence; rather, only those portions upon which editing or processing is to be performed are decoded. Once modified, substitute data may be inserted back into the compressed bit stream to take the place of decoded, edited data.

20 Claims, 14 Drawing Sheets

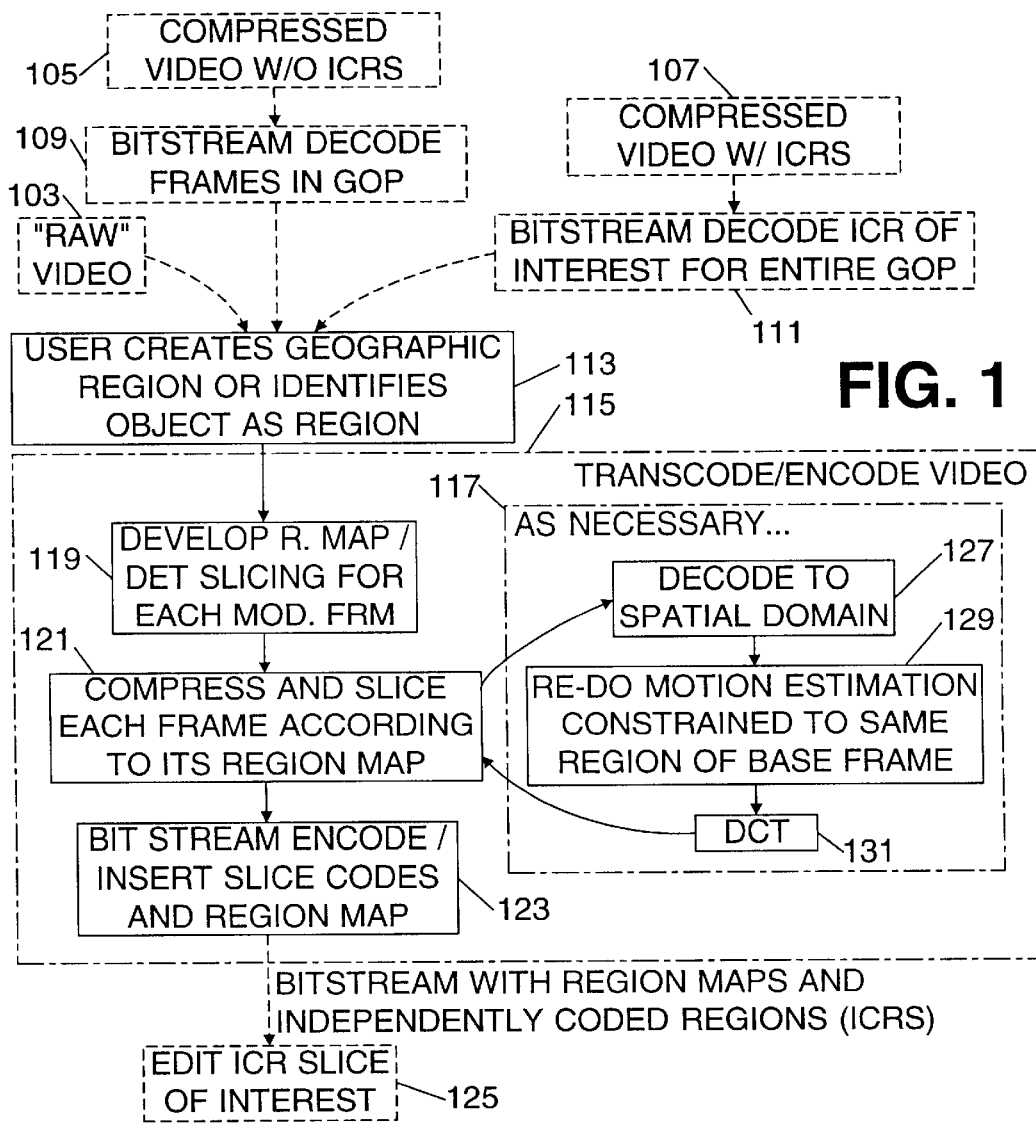
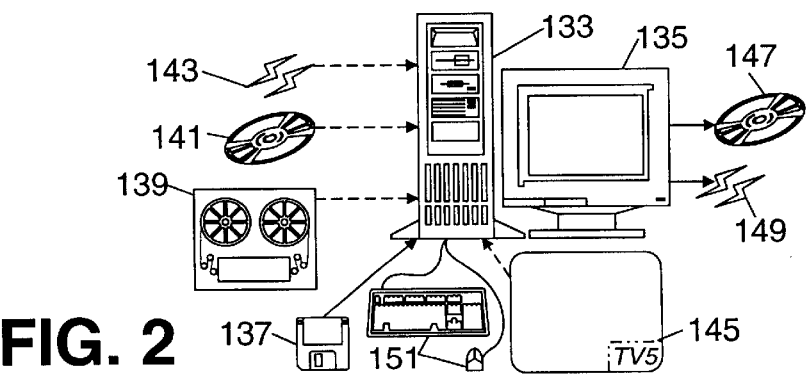

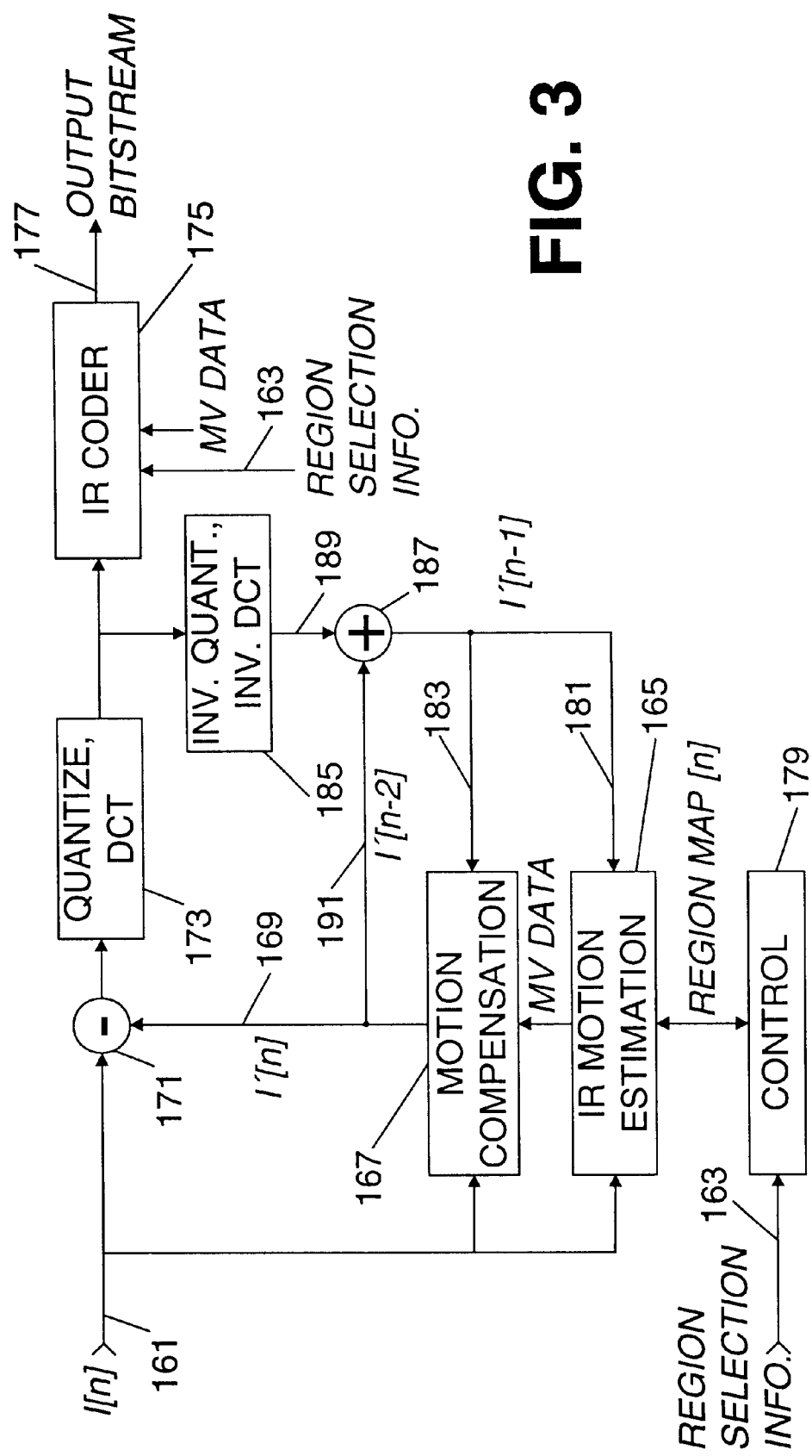

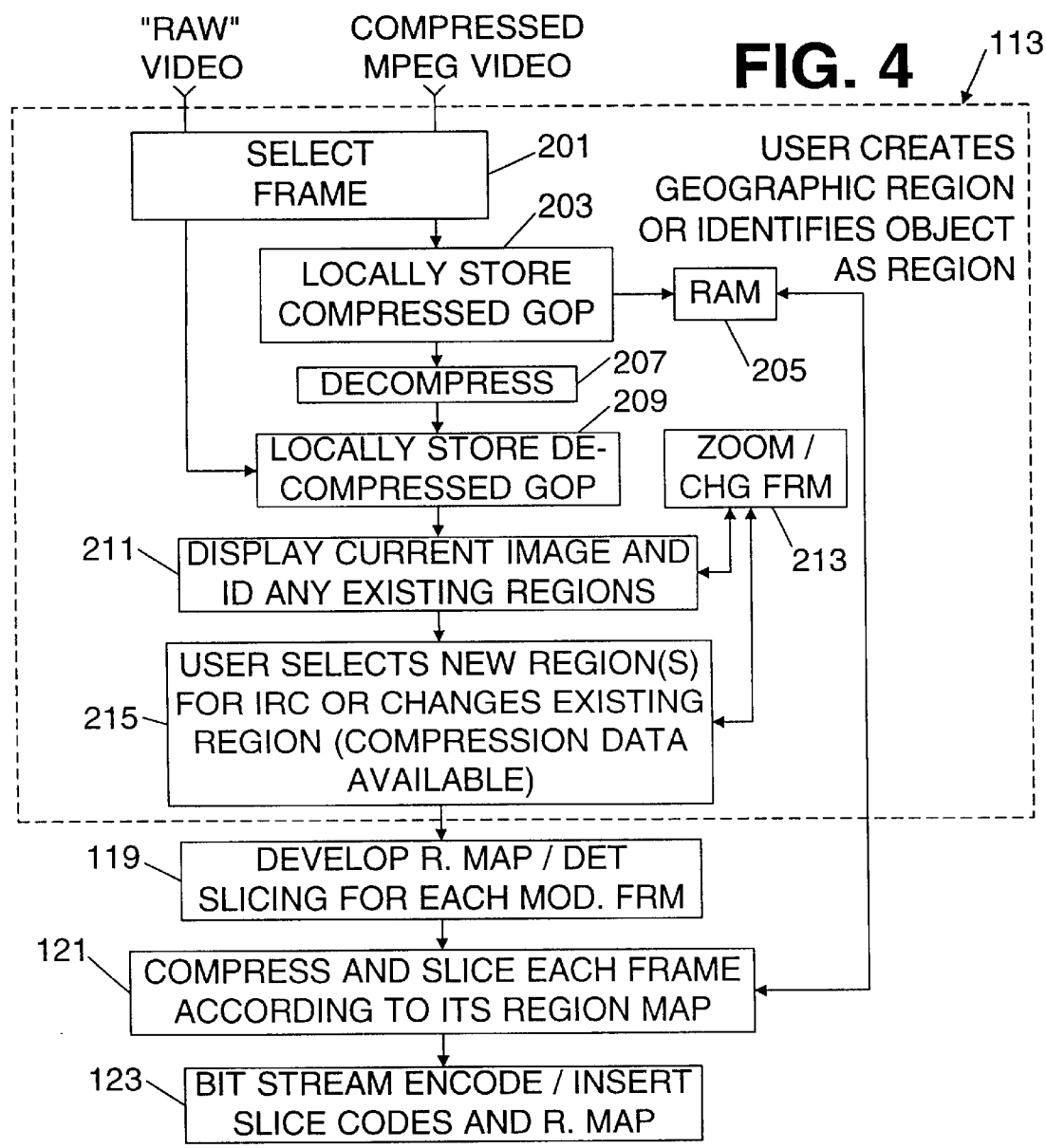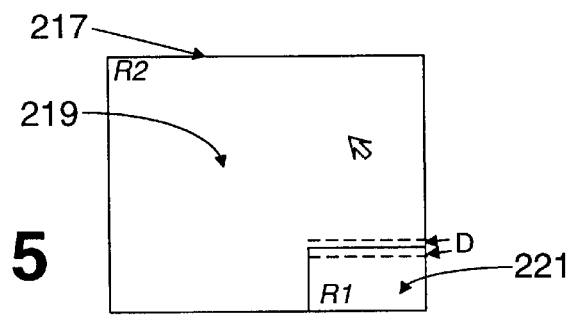

FIG. 8

| | 269 |
|---|---|
| BCK SIGN [R1] | 01 |
| LOGO [R2] | 01 |
| SHIRT [R3] | 10 |
| FORGND [R3] | 00 |
| BCK [R4] | 00 |

FIG. 10

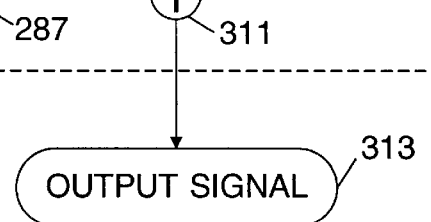

USER CREATES GEOGRAPHIC REGION OR IDENTIFIES OBJECT AS REGION — 113

DEVELOP R. MAP / DET SLICING FOR EACH MOD. FRM — 119

COMPRESS AND SLICE EACH FRAME ACCORDING TO ITS REGION MAP — 121

123

BIT STREAM ENCODE / INSERT SLICE CODES AND REGION MAP

COMPRESSED BITSTREAM FOR REGIONS ONLY — 289

EXISTING FRAME HEADER INFO. — 293

291 — CAN EX. HUFFMAN CD. BE USED?

YES → DCT AND QUANTIZE NEW MV + RESIDUALS DATA — 295

NO → INVERSE HUFFMAN CODE EXISTING BITSTREAM DATA — 301

307 — NEW MV DATA FOR ENT. FRAME

309 — BITSTREAM ENCODE ENT. FRAME DCT, QUANT, HUFFMAN CODE, INSERT FRM. & SL. HEADER INFO.

DCT AND QUANTIZE NEW MV + RESIDUALS DATA — 303

ORIG. HUFFMAN CODING — 297

NEW HUFFMAN CODING — 303

COMBINE DATA: INSERT NEW HEADER INFO. FOR ALL SLICES — 299

NEW HEADER INFO. — 305

COMPRESSED BITSTREAM FOR ENT. FRAME — 287

⊕ — 311

OUTPUT SIGNAL — 313

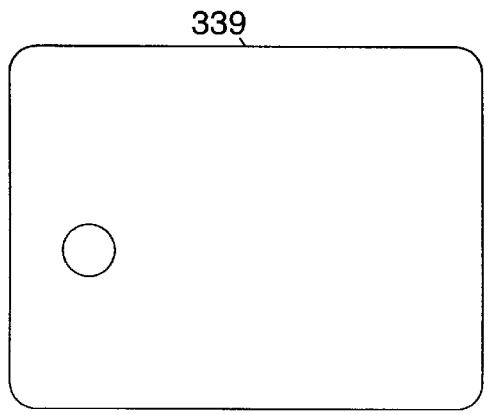
FIG. 14
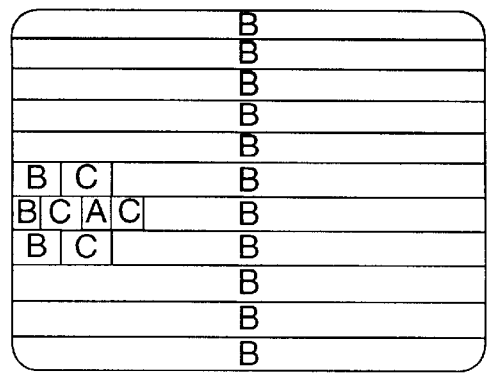
FIG. 15
341
| 10 |
FIG. 16
357
| 00000000000100000000 |
FIG. 17
359
| 111111101100011011111 |
FIG. 18
361
| 00000010010100010000 |
FIG. 19
| 00000010011100010000 |
| 11111111111010010000 |
FIG. 20
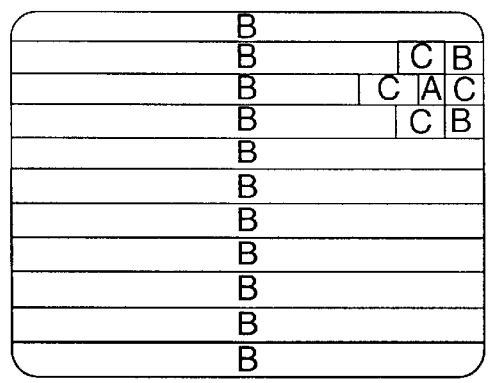
FIG. 21
FIG. 22
| 00000001000000000000 |
| 110110001011111111 |     365
| 001001010100000000 |
| 001001110100000000 |     367
| 111111101111111111 |
FIG. 23

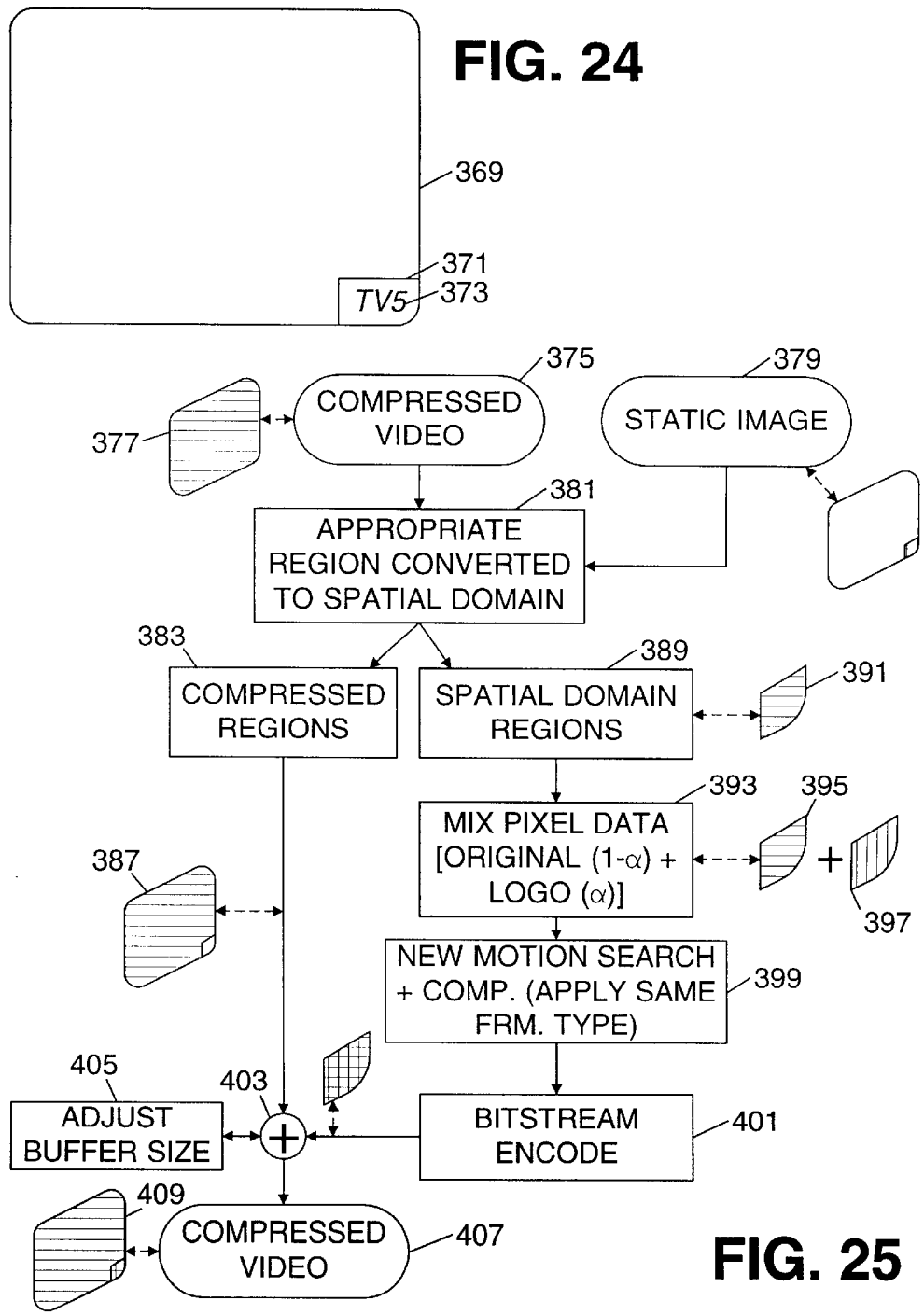

COMPRESSED VIDEO SIGNAL INCLUDING INDEPENDENTLY CODED REGIONS

The present invention relates to image sequence compression. More particularly, this disclosure provides a compression system that utilizes independently coded regions to permit select extraction of image objects, or editing of select areas of an image frame, without necessarily decompressing all image data in each frame. This disclosure also provides a mechanism of tracking the objects and regions across multiple frames such that, if desired, they may be independently coded and extracted from a video sequence.

BACKGROUND

Conventional editing or other processing of film or video images is performed in the "spatial" domain, that is, upon actual images rather than upon a compressed representation of those images. Since the final product of such editing or processing is frequently an uncompressed signal (such as a typical "NTSC" television signal), such editing or processing can sometimes with today's digital editors and computers be accomplished in real-time. With increasing tendency toward high resolution pictures such as high definition television ("HDTV"), however, Internet, cable, television, network and other service providers will likely all have to begin directly providing compressed signals as the final product of editing. As used herein, the term "video" will refer to any electronic signal that represents a moving picture sequence, whether digital, NTSC, or another format.

One problem relating to the new digital standards relates to efficiently and quickly processing video; with video stored or transmitted in compressed format under the new standards, it is difficult computationally to decompress video, process that video in the spatial domain, and then recompress output video. Examples of processing compressed video prior to display include providing fast forward, reverse and other effects typically associated with VCRs. Other processing examples associated with the production or broadcast of video include color correction, logo insertion, blue matting, and other conventional processes.

To take one example of this computational difficulty, in logo insertion, a local television station might receive a compressed satellite feed, insert its own TV station logo in a corner of the image that will be seen on viewers TV sets, and then broadcast a TV signal over cable, back over satellite or through the airwaves. Conventionally, the processing could be performed in real time or with a short delay, because it is relatively easy to decompress an image, modify that image in the spatial domain and transmit a spatial domain signal (e.g., an uncompressed NTSC signal). With HDTV and other new digital standards, which call for all transmissions in a compressed format, this quick processing becomes much more difficult, since it is very computationally expensive to compress a video signal.

All of the video examples given above, e.g., logo insertion, color correction, fast forward, reverse, blue matting, and similar types of editing and processing procedures, will collectively be referred to interchangeably as "editing" or "processing" in this disclosure. "Fast forward" and similar features commonly associated with a video cassette recorder ("VCR") are referred to in this manner, because it may be desired to change the sequence or display rate of frames (thereby modifying an original video signal) and output a new, compressed output signal that includes these changes. The compressed output signal will often require that frames be reordered and re-encoded in a different format (e.g., to depend upon different frames), and therefore is regarded as one type of "editing".

In most of the examples given, since editing or processing is typically done entirely in the spatial domain, a video signal must typically be entirely decompressed to the spatial domain, and then recompressed. These operations are typically required even if only a small part of an image frame (or group of frames) is being edited. For example, taking the case of logo insertion in the bottom right corner of an image frame, it is extremely difficult to determine which part of a compressed bit stream represents a frame's bottom right corner and, consequently, each frame of the video sequence is typically entirely decompressed and edited. If it is desired to form a compressed output signal, frames of the edited signal must then typically be compressed anew.

In this regard, many compression formats are based upon "motion estimation" and "motion compensation." In these compression formats, blocks or objects in a "current" frame are recreated from similar blocks or objects in one or two "anchor" frames; "motion estimation" refers to a part of the encoding process where a computer for each block or object of a current frame searches for a similar image pattern within a fairly large area of each anchor frame, and determines a closest match within this area. The result of this process is a motion vector which usually describes the relative position of the closest match in an anchor frame. "Motion compensation" refers to another part of the encoding process, where differences between each block or object and its closest match are taken, and these differences (which are ideally all zeros if the match is "good") are then encoded in some compact fashion, often using a discrete cosine transform ("DCT"). These processes simply imply that each portion of the current frame can be almost exactly reconstructed using the location of a similar looking portion of the anchor frame as well as difference values. Not every frame in a sequence is compressed in this manner.

Motion estimation is very computationally expensive. For example, in applying the MPEG-2 standard, a system typically takes each block of 8×8 pixels and searches for a closest match within a 15×15 pixel search window, centered about the expected location for the closest match; such a search involves 64 comparisons to find the closest match, and each comparison in turn requires 64 separate subtractions of multi-bit intensity values. When it is considered that a typical image frame can have thousands of 8×8 pixel blocks, and that this searching is typically performed for the majority of frames in a video sequence, it becomes quite apparent that motion estimation is a computationally expensive task.

With the expected migration to digital video and more compact compressed transmission formats, it is apparent that a definite need exists for quick compression systems and for systems which provide quick editing ability. Ideally, such a system should permit decoding and editing of a compressed signal (e.g., VCR functions, logo insertion, etcetera) yet permit real-time construction and output of compressed, edited video signal that can be accepted by HDTV and other new digital systems. Ideally, such a system would operate in a manner compatible with existing object-based and block-based standards and desired editing procedures, e.g., such that it can specially handle a logo to be inserted into a compressed signal, as well as other forms of editing and processing. Further still, such a system ideally should be implemented as much as possible in software, so as to be compatible with existing computers and other machines which process video. The present invention satisfies these needs and provides further, related advantages.

SUMMARY

The present invention solves the aforementioned needs by providing a system having independently coded regions. Using these regions, one may specially compress and encode an image sequence in a manner that permits extraction or editing of select image objects in the spatial domain, without need to decode and decompress the entire image sequence. If it is desired to modify a compressed output signal to include modified data for an object (e.g., for an edited object), new data can be inserted as appropriate in the place of the extracted object; with the object being independently coded, all other compressed data for the image (e.g., background or other objects) may be exactly re-used. In real time applications (such as logo insertion), this ability facilitates editing and production of a compressed output signal, using standard computer and editing equipment. As can be seen therefore, the present invention should have ready application to production, post production, network syndication, Internet video, and other applications which call for the production of compressed video.

More particularly, one form of the invention provides an improved signal format that is adapted for independent region processing. This signal may also be standard compliant such that it can still be decoded or processed with any standard compliant decoder or processor. A region can be user-defined to be an object of interest appearing in a video sequence, or a geographic location within video frames. A corresponding region for each frame is search limited during compression such that any motion vectors and residuals (if applicable to the frame) point only to a corresponding region within an anchor frame. Preferably, each frame has multiple regions, each independently coded from one another, with each object represented by a region thereby adapted for ready extraction.

As can be seen from the foregoing, the present invention facilitates extraction of objects or regions from compressed image sequences and, further, facilitates subsequent editing and re-compression with minimal use of processing resources; that is to say, with video compressed to have independently coded regions in accordance with the present invention, it should be possible to subsequently extract and edit one region in real time without requiring extensive computational resources. The present invention can therefore be expected to have significant utility in processing of digital image processing, especially digital video.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIGS. 1–10 illustrate the arrangement and operation of an encoder/transcoder that implements principles of the present invention.

FIG. 1 indicates primary functions of the encoder/transcoder.

FIG. 2 is a component level diagram, showing how software implementing the preferred embodiment is implemented to process an input video signal and to generate an output video signal.

FIG. 3 is a flow diagram showing M.P.E.G.-2 compression in the context of independently coded regions.

FIG. 4 is an expanded flow diagram, and indicates further functions performed within block 113 of FIG. 1.

FIG. 5 is an illustration of a visual display where existing regions are highlighted to a user who will modify existing regions, frame order, or add new regions.

FIG. 6 is an expanded flow diagram, and indicates further functions performed within block 215 of FIG. 4.

FIG. 7 is an expanded flow diagram, and indicates further functions performed within block 119 of FIG. 1.

FIG. 8 is an illustration of a table that may be used for each frame to track edits, a "registry of edits" as it will be labeled further below.

FIG. 9 is an expanded flow diagram, and indicates further functions performed within block 121 of FIG. 1.

FIG. 10 is an expanded flow diagram, and indicates further functions performed within block 123 of FIG. 1.

FIGS. 11–24 are used to explain a signal format for a video sequence, where the signal itself includes information sufficient to identify an object or frame location that has been independently coded, and to identify which image slices in a sequence permit decoding of the object of interest.

FIG. 11 illustrates the hierarchy of a basic MPEG format signal, including a video sequence having many groups of pictures (GOPs). Each GOP includes multiple frames, each frame includes multiple slices, and each slice includes compressed image data. FIG. 11 also shows bit stream codes for header information, for each of sequence, GOP, frame and slice level tiers. FIG. 11 further shows how region group definition and region map information are inserted into this preferred signal format.

FIGS. 12–14 illustrate a group of three image frames, where a ball appears to move from right to left across these frames.

FIG. 12 shows the ball at the upper right hand corner of a first image frame.

FIG. 13 shows the ball in the middle of a second image frame.

FIG. 14 shows the ball at the left side of a third image frame.

FIG. 15 corresponds to the third image frame (FIG. 14) and illustrates one methodology for how regions might be created and sliced in a MPEG-2 format, where region "A" corresponds to ball only, region "B" corresponds to a blue sky background, and region "C" corresponds to "boundary" areas having both ball and background. The rectangles of FIG. 15 represent nineteen image slices and are labeled "A," "B" or "C" only for purposes of illustrating whether the slice contains data belonging to these regions. Importantly, the preferred MPEG-2 format usually requires a new image slice for each new line of macro-blocks such that in practice a great many more slices would be indicated than nineteen slices seen in FIG. 15, which is used for illustration and explanation only.

FIG. 16 shows a hypothetical group map where two globally defined region groups have been defined for the sequence (a ball and a child) and a one bit entry is provided for each globally defined region group to indicate whether it is present in the GOP of FIGS. 12–14. [Otherwise stated, FIGS. 12–14 include the image of a ball but not of a child, which presumably appears elsewhere in the image sequence; thus, the bit entries are "1" (signifying that the ball is present in this GOP) and a "0" (signifying that the child is not present in this GOP).]

FIGS. 17–19 show a first region mapping scheme, corresponding to the third frame of FIGS. 14 and 15. Each of FIGS. 17–19 show a different one of three tables of the region map.

FIG. 17 shows a first table for region "A" of FIG. 15. The table has nineteen entries, one for each image slice seen in FIG. 15. Each entry indicates whether image data for the region "A" is found in the corresponding image slice.

FIG. 18 is similar to FIG. 17, except it shows the table for region "B" of FIG. 15.

FIG. 19 is similar to FIG. 17, except it shows the table for region "C" of FIG. 15.

FIG. 20 presents a second region mapping scheme. Instead of separately identifying transition regions for both ball and background (as was illustrated by FIGS. 15 and 17–20), only two tables are used. In the first row of FIG. 20 (i.e., a first table), values represent whether a corresponding image slice has any ball data (whether or not background data is also present). A second row (i.e., second table) indicates whether a corresponding image slice has any background data (whether or not ball data is also present). One difference between the two mapping schemes is that the second mapping scheme, represented by FIG. 20, allows an image slice to be associated with two different regions. The mapping scheme of FIG. 20 is preferred especially when many regions are to be used (and, thus, where it might be cumbersome to have separate regions dedicated to each boundary between objects).

FIG. 21 is similar to FIG. 15, except that FIG. 21 shows the first mentioned mapping scheme for the first frame of FIG. 12. As can be seen from FIG. 21, its image data represents the position of the ball in the upper right hand corner of the first image frame; FIG. 21 defines eighteen image slices instead of the nineteen image slices of FIG. 15.

FIG. 22 illustrates the first mapping scheme applied to the example of FIG. 21. In particular, FIG. 22 illustrates the entire region map including three tables, one for each of regions "A," "B" and "C" of FIG. 21, each having eighteen data values corresponding to eighteen image slices.

FIG. 23 illustrates the second mapping scheme applied to the example of FIG. 21. In particular, FIG. 23 illustrates the entire region map including two tables, one for each image slice having ball data (i.e., regions labeled "A" or "C") and one for each image slice having background data (i.e., regions labeled "B" or FIG. 24 is a hypothetical image frame showing a local television station logo "TV5" which has been inserted in the bottom right hand corner of the image frame. FIG. 24 is used to explain creation of a globally defined region group corresponding to the bottom right hand corner of each image frame. Such a global region group is defined in logo insertion applications, such that a corner of each frame is inherently independently coded for ready logo insertion, without complete decoding and decompression of the entirety of each image frame in a video sequence.

FIGS. 25–29 are used to describe several editing applications facilitated by the use of independently coded regions.

FIG. 25 provides a flow diagram for logo insertion; in connection with FIG. 25, it is presumed that a compressed video signal input already has an independently coded region at the bottom right hand corner of each image frame.

FIG. 26 presents a flow diagram for color correction; in connection with FIG. 26, it is presumed that one wishes to change the color of an actor's shirt, where the shirt or the actor have already been independently encoded within a compressed video signal input.

FIG. 27 presents a flow diagram showing one method of fast forward or reverse play.

FIG. 28 presents a flow diagram showing the splicing together of two image sequences.

FIG. 29 presents a flow diagram showing the splicing together of an image sequence with an image, or second image sequence; the image or second image sequence, represented as a billboard close-up featuring the slogan "EAT AT JOE'S" is illustrated as being mixed into an independently coded region of the first image sequence. The processes represented by FIGS. 27 and 28 may be employed in cases of mixing two image sequences together, where the second image sequence is to be inserted into an independently coded region of the first image sequence.

DETAILED DESCRIPTION

Figure 6:
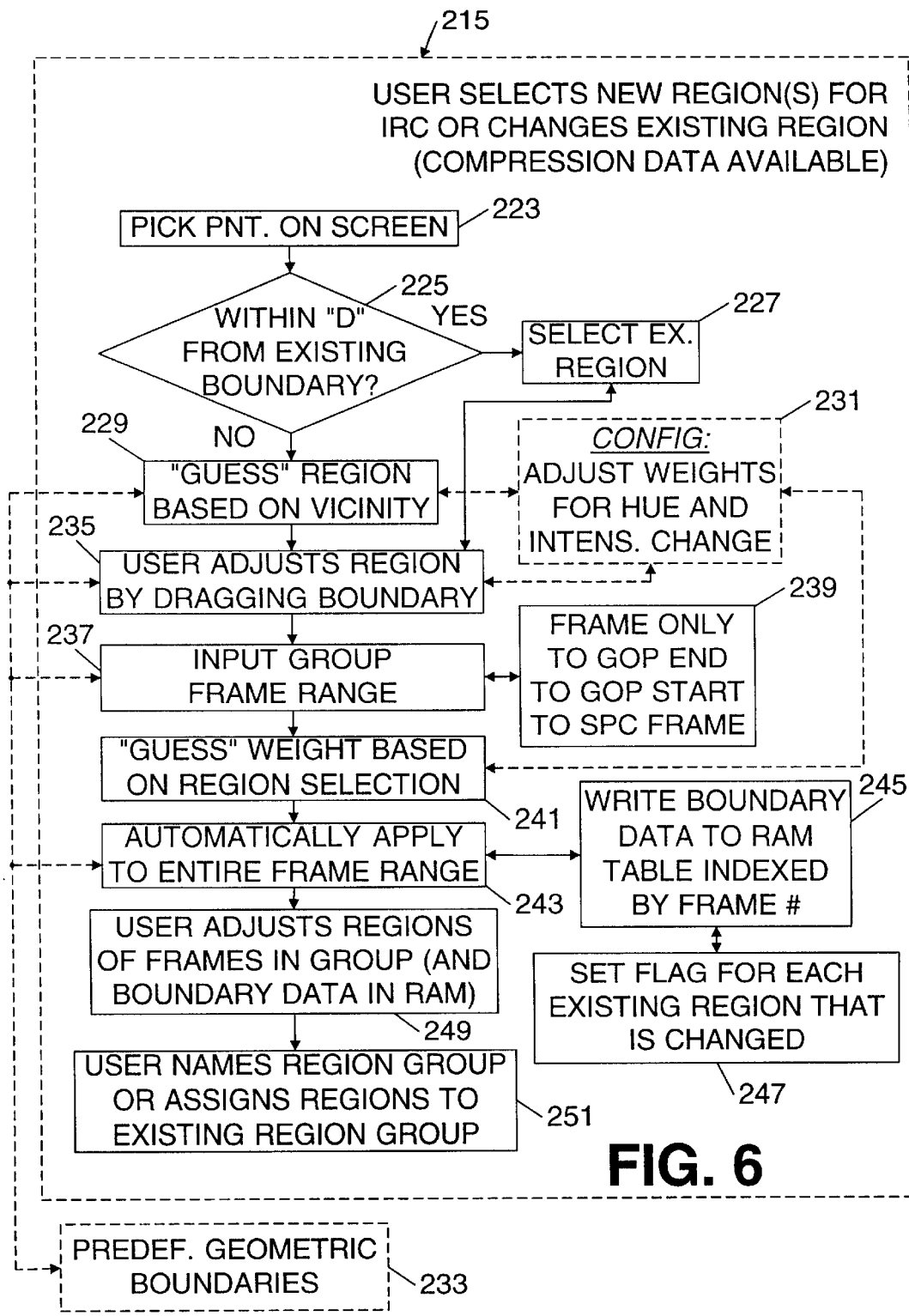

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention is not intended to limit the enumerated claims, but to serve as a particular example thereof. The particular example set out below is a preferred implementation of several components that implement, facilitate and employ independently coded regions. The invention, however, may also be applied to other types of systems as well.

I. General Introduction.

This disclosure sets forth an encoder, a decoder and several signal formats. Each of these items have a wide variety of applications that will be apparent from the description below.

The encoder takes a data sequence having discrete frames, and compresses those frames for storage or transmission such that "regions" of frames can be independently extracted and decompressed. The frames are subdivided into these regions and then encoded using certain rules, such that they may be decoded with necessary decoding the entirety of every frame in the sequence. The encoder may be used to newly compress a "spatial domain signal" (that is, conventional analog or display-ready input signal) to have independently coded regions ("ICRs"), and it may also be applied in the form of a "transcoder," that is, in a system that receives a compressed input, modifies it in some manner, and then applies an encoder to provide a compressed output signal with ICRs as desired. It is hoped that use of this encoder will make it relatively easy for TV networks, stations, broadcasters, post-production houses and other entities to edit or process a compressed signal and provide a compressed output at or near real-time. For example, use of an encoder or transcoder as mentioned above for satellite signal distribution may render it relatively easy for a downstream TV station to insert its own logo and quickly retransmit a modified signal, through editing only one ICR of interest and re-encoding only the edited portion. If a received signal has been already generated to have these ICRs, then an encoder or transcoder may also be used by the local TV station to facilitate quick editing.

It is hoped that use of these various elements will make it relatively easier to fabricate digital systems in hardware and software that can process signals and provide compressed output signals at or near real-time. The embodiments described below can be applied to audio signals or other information suitable for transmission in a frame type format, but the preferred application is to video, especially HDTV and digital standards that call for transmission or storage in a compressed format. The preferred system described below operates using "MPEG-2" compression standards (indicating standard no. 2 proposed by the "moving pictures experts group"), but the system can be applied to any compression format, including MPEG-1, MPEG-4, H.261, H.263 and other types of formats. While conventional systems operate on analog television signals (e.g., while a digital video disk ("DVD") player typically provides an analog television signal output), it is expected that with the spread of Internet broadcasting and HDTV especially, more systems will necessarily accept compressed inputs, and one primary application of the present invention is to facilitate video processing systems (such as VCRs and disk players) which provide a processed or edited compressed output signal in real-time. Another primary application of the present invention is to video broadcast systems used in satellite transmission, cable routing, Internet broadcasting, network or TV station editing and similar types of systems where a compressed video signal is a desired output.

Thus, it should be apparent that there are a wide variety of systems to which the elements and techniques described below may be applied, including to home entertainment systems (such as televisions, VCRs, disk players, home routers or servers for video signals), video recording (such as by networks, live sporting events and the like), video processing and editing (such as by networks, post-production houses, studios, TV stations, Internet broadcasters, program distributors and the like) and by local distributors such as TV stations and cable and satellite service providers.

As used in this disclosure, the terms identified below shall have the following meanings.

A "frame" of data shall be interpreted to apply to audio, audiovisual data, and any other type of data that is typically transmitted in multiple, discrete frames.

"Software" includes any stored instructions that electronically control the functions provided by a system, and specifically includes firmware as well as software.

"Video" includes image data that is transmitted or stored electronically as a sequence of image frames, and shall specifically include all television formats, irrespective of frame rate, color modulation schemes and other features which distinguish individual standards. For example, "video" includes formats used for video conference, computer monitor transmission and television formats wherever developed. "Video" specifically includes digital formats (e.g., "DVD" and "HDTV"), differing compression formats (e.g., "MPEG" schemes and "H.261" and "H.263") and different conventional analog television formats (e.g., "NTSC," "PAL" and "SECAM").

An "anchor" frame includes any frame upon which another frame directly depends for reconstruction, and it may be either an independent frame or a dependent frame. As non-limiting examples, in conventional "MPEG" formats, dependent frames may be recreated from independent "I" frames as well as predictive "P" frames (which themselves depend upon other frames for reconstruction); both of these "I" and "P" frames would be anchor frames if another frame uses them for reconstruction.

An "independent" frame includes any frame that does not depend upon another frame for reconstruction, e.g., an independent frame is compressed in a manner where its image content can be completely obtained without decompressing any other frame. In conventional "MPEG" formats, only "I" frames are independent.

A "dependent" frame includes any frame that does depend upon another frame for reconstruction. In conventional "MPEG" formats, a dependent frame can include "P" frames (themselves depending upon either "I" or "P" frames, which are previously decoded) as well as "B" frames (themselves depending upon one or two "I" or "P" frames which are previously decoded). Since "B" frames can depend upon two anchor frames (one of which can be later in the video sequence), the frames are typically stored or transmitted out of order. For example, if three consecutive frames are to be encoded as "I," "B" and "P" frames respectively, these frames would be stored or transmitted in the order "IPB" and would be decoded in this order and then reordered for display.

A "current" frame includes whichever frame is currently being processed. For example, when encoding a dependent frame, the dependent frame is the "current" frame and the corresponding "anchor" frame(s) would be whichever one or two frames is used as a direct reference for compression and reconstruction of the current frame.

"Coding" or "encoding" are used interchangeably, and refer to compression of image frames to a compressed format. The compressed format can be a conventional "IPB" format defined by various "MPEG" standards, a compressed bit stream (e.g., "I," "P" or "B" frames which then are quantized, Huffman coded, etcetera, to simply be a stream of numbers), or another format.

An "independently coded region" or "ICR" includes image data that is coded in a restricted manner, so that a portion of a video sequence may be encoded in dependency upon each other only. As an example, if a "current" image frame is to be encoded as a "P" frame (that depends upon a different "I" frame) and it is desired to encode a set of actors independently from a background image, then an "independently coded region" might be created separately for each of the set of actors and the background. That is to say, each of the "P" frame and the "I" frame could be divided into two regions, and each region (e.g., the set of actors or the background) could be extracted and recreated from the video sequence without having to decode the other region (the background or the actors, e.g., with this latter data remaining in a compressed format). If it is desired to edit a region, for example,.to change the color of a particular actor's shirt, this "color correction" may be accomplished without necessarily decoding the background region, and a color corrected signal may then be re-encoded into bit stream format and inserted in the place of the original bit stream data for the set of actors. [In this example, the background data would not have to be changed, although it might be necessary to modify some front end parameters for the image frame, such as buffer sizes.]

A "data group" or "region group" refers to any set of data that is to be grouped together across several frames; the individual pixel values of a data group may change from frame-to-frame. For example, if it desired to independently encode a mountain that appears as one background image of a moving scene, and each frame features a slightly different perspective of the mountain, the mountain might be one data group; its relative size and color might change from frame to frame, but in each frame its data would be grouped together as a "region" and each region would be separately encoded in each frame, such that across a frame sequence, the entire mountain can be singled out and extracted and decoded, independent of other compressed data.

These and other defined terms will be further described and applied below.

II. The Principal Parts.

FIGS. 1–9 are used to help describe the operation of an encoder and transcoder. The encoder is used both to newly encode video signals, and also as a part of a transcoder which either converts a compressed signal to an ICR format, or reassembles an edited sequence into a compressed format.

Ideally, the result of either of these (encoder or transcoder) processes is an ICR signal that may be displayed or further used in editing. Several preferred formats for this signal are described below, with reference to FIGS. 10–24. One format involves embedding region information directly within an output signal. For example, in filming a program, it might be desired to film actors or other objects against a blue background, such that the actors or objects may later be combined with a specific scene (e.g., a jungle scene) via electronic "blue matting." In this instance, it might be desired to separately encode the foreground (the actors or objects) as one or more ICRs and the background as another ICR to minimize processing required in the "blue matting" procedure. Since the foreground actors or objects in this example may move in position with respect to each frame, it may be necessary to specify directly in the header information for a compressed scene exactly where to find each ICR among the bit stream data for that frame; several formats for providing "region maps" are described below, such that each object can be extracted from bit stream data for each frame. Stated somewhat differently, this first "region map" format involves identifying each ICR in bit stream header information, such that the output signal can be examined, ICR position derived from the signal, and this information used to extract each ICR from each frame. A second format does not use this embedded "region map" information, but instead relies upon default or constant region information. For example, it may be desired simply to have a static data group (e.g., a static object or fixed region such as the bottom right hand corner of each frame) that is constant for all frames of a "GOP" or image sequence. In this instance, information on region location could be provided in a user manual, indicated on a label for a video disk or tape, or via some other mechanism, and a specific map for each frame would not be needed.

Finally, the remaining FIGS. are used to exemplify some uses for a signal having ICRs and a decoder, respectively. For example, one use of an ICR signal is for enabling efficient and quick editing by extracting and changing a specific data group only. Techniques and systems for making use of ICRs and the specified signal formats are described furthest below, with reference to FIGS. 25–29. These FIGS. also illustrate operation of a decoder that may be used to generate spatial domain data that can be employed for such efficient and quick editing.

With this explanation in mind, the making and use of a preferred encoder and transcoder will now be further described.

III. Operation of A Preferred Encoder And Transcoder

A. Overview.

FIG. 1 illustrates the operation of a basic encoder or transcoder that implements principles of the present invention. Preferably, one image processing system accomplishes both functions and accepts any of (a) "raw" or uncompressed video 103, (b) already compressed video 105 without ICRs which is to be processed to convert it to an ICR format, or (c) already compressed video 107 having ICRs which are to be edited or processed in some manner. As indicated by blocks 109 and 111, compressed video must either be entirely bit stream decoded if there are no existing ICRs or, if there are existing ICRs, then those ICRs that are to be selectively edited must be decoded. It should be noted that one purpose of the encoder or transcoder is to provide a compressed output signal, and many of the procedures described below are utilized to take shortcuts (e.g., improve processing speed) in deriving such a compressed output signal.

The encoding or transcoding process typically involves presentation of some display to a user who oversees the encoding process. A "user" as applied in this section of the disclosure refers to one operating the encoder or transcoder to cause the selection of, or redefinition of, regions that will be independently coded. Typically, at least one static frame will be displayed which permits the user to select groups of data that will be independently coded; the user can "drop and drag" a cursor over image area to select an arbitrary region on the screen. This region may be made static for all frames selected, or it can be used initially identify an object, with image processing software operating to automatically track the object's movement through multiple frames and to select suitable corresponding regions throughout those frames using well known tracking and image detection routines. A primary purpose of these routines will be to provide a preliminary selection of object boundaries based upon a frame range specified by a user. If existing video already has ICRs, then the display functions will cause each existing ICR to be highlighted, and permit a user to change existing boundaries or add or delete ICRs.

Importantly, each frame to be visually displayed to the user must typically be decoded, but .as is implied by FIG. 1, not all frames in a sequence or program need to be displayed or decoded. For example, if a user selects a lower right hand corner of each image frame (e.g., a 4×2 macroblock area for all frames), then the encoding software can automatically encode the entire frame range of interest without requirement of decoding that entire frame range for user display.

Function block 113 represents the various functions associated with region selection, including display, and these functions will be further explained below.

Once regions have been selected by the user and defined over the desired frame range of interest, the image processing system then encodes (or transcodes) the selected range of video, as indicated by master function block 115. During this process, if prior compression data is available for data which has been unaltered, that data is preferably re-used to save time that might otherwise be required in computing new compression data for unaltered regions, as indicated by block 117. Details are described below for one system that permits image processing software to track exactly which image frames have altered and in which manner alteration has been occurred. As part of the preferred encoding process and format, a region map can be developed for each frame of a group of pictures ("GOP") which indicates how each ICR is to be "sliced." The GOP is then compressed according to these region maps, and the result of this process ideally is a bit stream with independently coded regions. These operations are indicated, respectively, by blocks 119, 121 and 123. The bit stream is then suitable for storage or transmission, and is inherently suited for optional editing a portion of the bit stream without having to completely decode each entire frame of interest, as indicated by an optional process block 125.

A significant time advantage is provided in compressing a signal where prior compression data is available, as indicated by function block 117 in FIG. 1. To this effect, for data which either has been edited, or which has not itself been edited but is dependent upon an anchor region (where either the dependency upon the anchor frame or substantive content of the anchor region has been edited), such data is newly encoded from spatial domain data and then mixed with re-used, prior compression data as indicated by blocks 127, 129 and 131. Whether prior compression data can be re-used is a question of tracking, since one dependent image frame can depend upon another, which can depend upon another, and so-on. Since ICRs in the preferred embodiments must depend solely upon one another, i.e., motion vectors in one frame can point only to the same object in an anchor frame, then any change outside the ICR will not affect any dependent frame. However, any editing that provides frame re-ordering or that alters data content of an anchor frame will also probably affect all dependent frames which stem from that anchor frame. Consequently, tracking software preferably keeps track not only of changes made to the substantive content of a current frame, but also to any changes made to corresponding regions of an anchor frame. The tracking software preferably creates tables during this tracking process that can be readily used to determine whether compressed input video (if available) may be directly re-used as part of an output signal. Stated again, preferred tracking software that encompasses those functions will be further described below; information of this tracking software may also be gleaned from U.S. patent application Ser. No. 09/235,101 for "Image Compression Featuring Selective Re-Use of Prior Compression Data," filed on behalf of inventors Susie J. Wee and Marc P. Schuyler) on Jan. 21, 1999, which is hereby incorporated by reference.

FIG. 2 illustrates various physical components used to implement an encoder or transcoder 101. Typically, the system is based upon an image processing computer 133 having an associated monitor 135 and software 137 which controls the computer's operations. The computer 133 may be a conventional computer workstation and it may also be a specialized digital editing machine used by networks, post-production houses and others. Typically, a conventional workstation will be retrofitted to have MPEG decoders and other equipment (not shown in FIG. 2) that facilitate video processing, including various frame buffers and a digital signal processing chip that operates collaterally to a workstation's CPU. The frame buffers may also be implemented in conventional computer memory, although typically in the case of a conventional workstation, it is desired not to burden the CPU with decoding and frame memory management functions.

The computer 133 receives a video input from a conventional video source, such as a tape source (video, telecine, or other image source) 139, a disk player such as a DVD player 141, or a satellite, cable or other feed 143. Sometimes, it may be desired to mix another image with this video input, such as a foreground image (e.g., a TV station logo) or a background image, and such an optional second feed is represented by the reference numeral 145. [There may be third and fourth feeds as well; for example, it may be desired to splice multiple commercials into a live feed of a sporting event, and each commercial might be supplied via an independent and additional feed. These optional feeds are not illustrated in FIG. 2 and it should be understood that reference numeral 145 represents any additional feed that is to be combined or mixed with the input video 139, 141 or 143.] As a result of the processing performed by the preferred encoding/transcoding device, an output signal is generated and compressed to a bit stream format and is either stored (e.g., on tape, in computer memory or on disk) or transmitted live (such as by satellite or over the Internet), as represented by reference numerals 147 and 149. Finally, the computer 133 receives user commands from conventional user interface equipment 151, which can include a mouse, keyboard, digitizing pad or other equipment.

FIG. 3 also provides flow of the preferred encoding process. In FIG. 3, the variable I refers to "image," while the operand [n] indicates that the preferred system is operating upon digital samples of different frames; n denotes data for the current frame, n−1 denotes data for an immediately prior frame, and n−2 denotes data from two frames prior. In this case, frame n−1 is presumed to be an anchor frame for frame n, and frame n−2 is presumed to be the anchor frame's anchor frame. The variable I' indicates reconstructed (i.e., decoded) image data including quantization errors.

As indicated by FIG. 3, the encoding system receives digitized video 161 that is to be encoded, together with region selection information 163. The digitized video is stored in a buffer on a frame by frame basis (preferably using a circular frame buffer that holds a number of frames at a time) and is used by motion compensation and independent region motion estimation systems 165 and 167 to calculate a block of data estimates (i.e., the "closest match"), indicated reference numeral 169 in FIG. 3. This closest match data is provided from decompressed image data supplied by inputs 181 and 183 (these inputs incorporate quantization errors from an anchor frame's compression, just as would be seen by a decoder). The closest match information is passed to a first summing junction 171 which calculates residuals, e.g., a.block of different values obtained by subtracting a "closest match" of an anchor frame from the data block under consideration. From there, a discrete cosine transform is applied to the residuals, which are then quantized (as collectively indicated by function block 173) to yield a data block with non-zero entries herded in an upper left-hand corner of the data block. This information is then passed to an independent region ("IR") coder 175, which encodes motion vectors from the motion estimation system 165 together with the quantized data. The motion vectors have already been limited by the motion compensation system to point only to associated data in anchor frames, as appropriate, and the IR coder 175 is supplied with region selection information 163 for proper insertion of slice codes, such that each region is comprised of discrete slices. The IR coder applies run-length encoding and Huffman coding to quantized data, and inserts appropriate MPEG header codes (including slice codes, as further discussed below) to generate an output bit stream 177.

Importantly, not all image frames are compressed using motion vectors; using a M.P.E.G.-2 process, all data within "I" frames are encoded without using motion estimation and compensation, and select data blocks within "P" and "B" frames may also be encoded in this manner. That is to say, a "P" frame could have null motion vectors and be locally or entirely coded as an "I" frame notwithstanding its "P" frame designation, and a "B" frame could be encoded to have data dependencies only in one (forward or backward) direction, or without any dependency. A control routine 179 determines this encoding according to well known procedures and algorithms developed for M.P.E.G. coding. The control routine 179 also limits the motion estimation in its search procedures. That is to say, whereas conventional motion search would focus upon a "closest match" location within an anchor frame and define a search window about that location, the control routine 179 only permits "closest match" locations which correspond to the same object or region in an anchor frame, and it limits the search window to also lie within this object or region. In this regard, region selection information is preferably pre-computed for the entire sequence of interest, such that the encoding system "knows" where the corresponding regions are within the anchor frame(s), if any; ICRs preferably are described by a unique naming attribute, such that corresponding regions from different frames may be readily associated (e.g., they have the same name). If no corresponding region is available in an anchor frame, or if the closest corresponding region location in an anchor frame is significantly different in position relative to the data block under consideration, then the control routine 179 may decide to encode the data of interest in an independent manner (i.e., encode "P" frames solely in an independent manner or "B" frames in a unidirectional manner).

As previously mentioned, inputs 181 and 183 are provided to the motion estimation and compensation systems for use in compressing subsequent dependent frames; these inputs are derived just-coded compressed video to provide decompressed video in the same manner as would be seen by a decoder. This procedure (i.e., the seemingly unnecessary use of encoded-then-decoded video) is necessary, because the quantization procedure usually rounds some values and might introduce errors that would "snowball" unless quantized image data were used in the motion compensation process. The decoding of data is indicated in FIG. 3 via a function block 185. Resultant residuals for an anchor image estimate, n−1, are then used for the encoding or a current frame n. A second summing junction 187 is used to construct an anchor image estimate I' [n−1] from both the anchor image residuals 189 and image data 191 from any anchor frame's anchor frame I' [n−2].

With the operation of the preferred encoder and transcoder thus presented, region selection and tracking will now be described in additional detail.

B. Region Selection in The Preferred Embodiments.

Region selection is preferably accomplished using computer workstation software and standard user interface tools, including a mouse and computer display monitor. Ideally, this software handles different types of video inputs, including inputs which may or may not be compressed, and compressed inputs which may or may not already have ICRs. Preferably, the hardware being used has a MPEG decoder, frame grabber or similar add-on computer hardware that provides for localized storage and display of a small number of frames on a real-time basis. The preferred region selection process 113 is further represented by FIG. 4, which shows additional steps performed within the block 113 from FIG. 1. FIG. 4 presents detail as to the initial processing, storage and display of images; function block 215 represents the actual region selection process, and will be further described in connection with FIG. 6.

Initially, it should be noted that preferred software provides the user with the ability to play video forward and backward, to stop and pause video, and to fast forward and fast reverse displayed video. In addition, the preferred software provides the user with the ability to select a specific frame (based on frame number or time) and to automatically scroll to the selected frame. The software, in combination with the hardware discussed above, will automatically display images as appropriate on the display monitor, and provides any decoding functions to display the desired frames of the video.

Armed with these abilities, the user begins by selecting a specific frame, as indicated by block 201 of FIG. 4. If the input video was in compressed format, the entire compressed GOP and decompressed GOP for the selected frame (i.e., including both prior and anchor frames) are both stored in quick-access memory, such as indicated by blocks 203, 205, 207 and 209. At this point, the preferred software identifies any existing regions in the frames being displayed, as indicated by block 211 of FIG. 4; this region information may be supplied via region maps embedded within the video signal, or the software may be configured to display constant geographic regions, for example, a "box" that will be used for logo insertion. Any existing regions preferably have a highlighted outline superimposed upon the displayed image, together with a display of region number or naming attribute (such a display is indicated by FIG. 5 as discussed below). [Since as also discussed below, each region is encoded as a discrete number of image slices, an outline of regions is fairly easily derived lie at macroblock borders.] The image display software ideally will afford a zoom function 213, such that the user can see region boundaries in additional levels of resolution. At this point, the user has decoded some amount of image data as appropriate (preferably an entire GOP), and is presented with a display of an image frame with existing regions highlighted for possible editing of those regions. The creation of new regions or editing of displayed existing regions is represented by block 215 and, again, a zoom function 213 is provided during this process to enable a user to fine tune region boundaries.

FIG. 5 is a hypothetical depiction of a display which highlights regions in relation to an image screen 217. In particular, two regions are indicated including a first region 219 that takes up most of the screen and displays the designation "R2," and a second region 221 (bearing the designation "R1") that takes up the bottom right corner of the screen. Such a second region might be used, for example, for logo insertion. Ideally, the software permits adjustment of these regions by "dragging" boundaries, such as the upper boundary found within a cursor tolerance range "D;" the region boundary will typically fall at a macroblock boundary.

FIG. 6 provides additional detail as to how a user selects new regions or changes existing regions, and elaborates upon the functions performed by block 215 of FIG. 4.

With an image displayed on a screen, a user picks a point within the screen, and the software determines whether the point is "close enough" to a region boundary (such as within the tolerance "D" mentioned above). If the answer to this inquiry is affirmative, the software presumes that the user wishes to edit the boundaries of the existing region. These functions are variously performed in blocks 223, 225 and 227 of FIG. 6.

As indicated by function block 229, if the user-selected point is not "close enough" to a region boundary, the software proceeds to "guess" a new region based upon image attributes in the vicinity of the selected point. This "guess" is preferably based upon standard image processing techniques, such as hue or intensity similarity, edge detection or other common image processing techniques or any mix of them. Preferably, a mix of techniques is applied, with technique emphasis based upon a weighting function 231 and user-supplied parameters; in this way, each user can tune automated region detection functions to his or her interests. A "guess" may also be based upon pre-defined geometric selection parameters (represented in box 233), such as a rectangular region used for logo insertion. If a user selects regions such that they overlap, the software preferably subdivides the regions to avoid overlap (e.g, two overlapping regions would become three or more regions); this subdivision is not required, and whether regions may overlap is discussed below in connection with object boundary treatment with the preferred signal format.

Once a region has been automatically "guessed" based upon the user-selected point or area and automatic extrapolation of a region, the software preferably permits a user to adjust region boundaries by "dragging" those boundaries in either rectangular and non-rectangular fashion. [Here again, the user selects the existing region by placing a cursor "close enough" to the particular region boundary and clicking his or her mouse.] A zoom function (not indicated by FIG. 6) may also be employed if desired to ensure that the user-selected region encompasses exactly the image data desired by the user. Further, if desired, the software may include a feedback function that automatically adjusts the user-supplied configuration parameters (or a temporary copy thereof used for one frame range) to more accurately reflect the user's choice of region. With the region accurately defined, the user selects a menu function or icon (not indicated in FIG. 6) to define a frame range to which the region criteria is to be applied. For example, as indicated by block 239, the user is preferably given choices of selecting the current frame only, a range from the current frame to the GOP end or start, or a range to or from a specific number of frames or to a specific frame number. These choices are only illustrative, and actual implementation is a matter of software design choice. With a frame range having been selected, the user then selects a menu function or icon to cause automatic application of the region selection information and parameters to all frames within the chosen frame range; the user may scroll through a display of all such frames if desired (with provision of a graphical display of highlighted region boundaries such as indicated by FIG. 5), and may further fine-tune individual boundaries. These tasks are represented by function blocks 235, 237, 239, 241, 243 and 249 of FIG. 6.

As referenced by numerals 245 and 247, each time the displayed frame is changed, boundaries for the various regions in the frame currently under display or processing are written to a RAM table having all region information for that specific frame number. For example, if (as is preferred) each region is constrained to fall at a macroblock boundary, the RAM table could consist simply of an identification of which macroblocks (by macroblock number) correspond to each region. If an existing region (reflected by the input signal) has been changed, it is also desirable to set a table value dedicated to the existing region, for tracking purposes. If the altered frame is an anchor frame, then the software automatically identifies any depending frames regions and begins (if applicable) or sets table values for those frames and sets similar values for those regions. This function is used to trigger compression analysis of affected portions of any dependent frame (even if image data within the dependent frame has not been altered), and will be further discussed below in connection with the tracking software.

Finally, with regions having been created and mapped to entire GOPs or an entire sequence, groups of associated regions are preferably named using ASCII text, preferably using a descriptive naming attribute (e.g., specific actor or object name). This naming attribute is preferably included in header information for a MPEG sequence, such as will be discussed below in connection with the preferred signal format. As an example of the utility of this feature, the embedding of region naming information directly into bit stream header information will enable downstream selection of a region for editing directly from the encoded bit stream (an actor's shirt, for example, may be separately named and later, recognized by this naming attribute and independently extracted from an encoded bitstream). As will also be discussed below, regions preferably are grouped in one of two general ways, namely, as "local" region groups (e.g., region definition spans only a single GOP or less) and "global" region groups (e.g., region definition spans more than one GOP). Two global region groups preferably are not permitted to share the same name, and two local region groups in the same GOP preferably are not permitted to share the same name. The naming function is designated by reference numeral 251 in FIG. 6. As used herein, a "region group" will refer to associated regions from different frames that are associated together, e.g., they are defined to refer to a single image area of interest or collection of items that are to be coded for independent extraction as a unit from a compressed bit stream; typically, the descriptive name attribute referred to earlier will be shared throughout a single region group.

Importantly, the tasks outlined above are easily implemented by a skilled software designer. Image detection software and processing techniques are well known in the art, and are many times found in commercially available software. It is well within the abilities of a skilled artisan to implement, modify or add to these features in order to provide similar results.

C. Compression and Formation of an Output Signal.

As indicated in connection with block 119 of FIG. 1, once region selection has been performed, the software prepares to compress the frames of interest. It will be recalled from FIG. 4, however, that region selection information is needed in order to limit motion search; any motion vectors from one region of a frame may only point to data in an anchor frame which is the same region group. In order to limit motion search in this manner, it is first desired to determine how regions will be sliced when it comes time for bit stream compression; this function is illustrated by block 119 of FIGS. 1 and 3, and is explained in greater detail with reference to FIG. 7.

Figure 7:
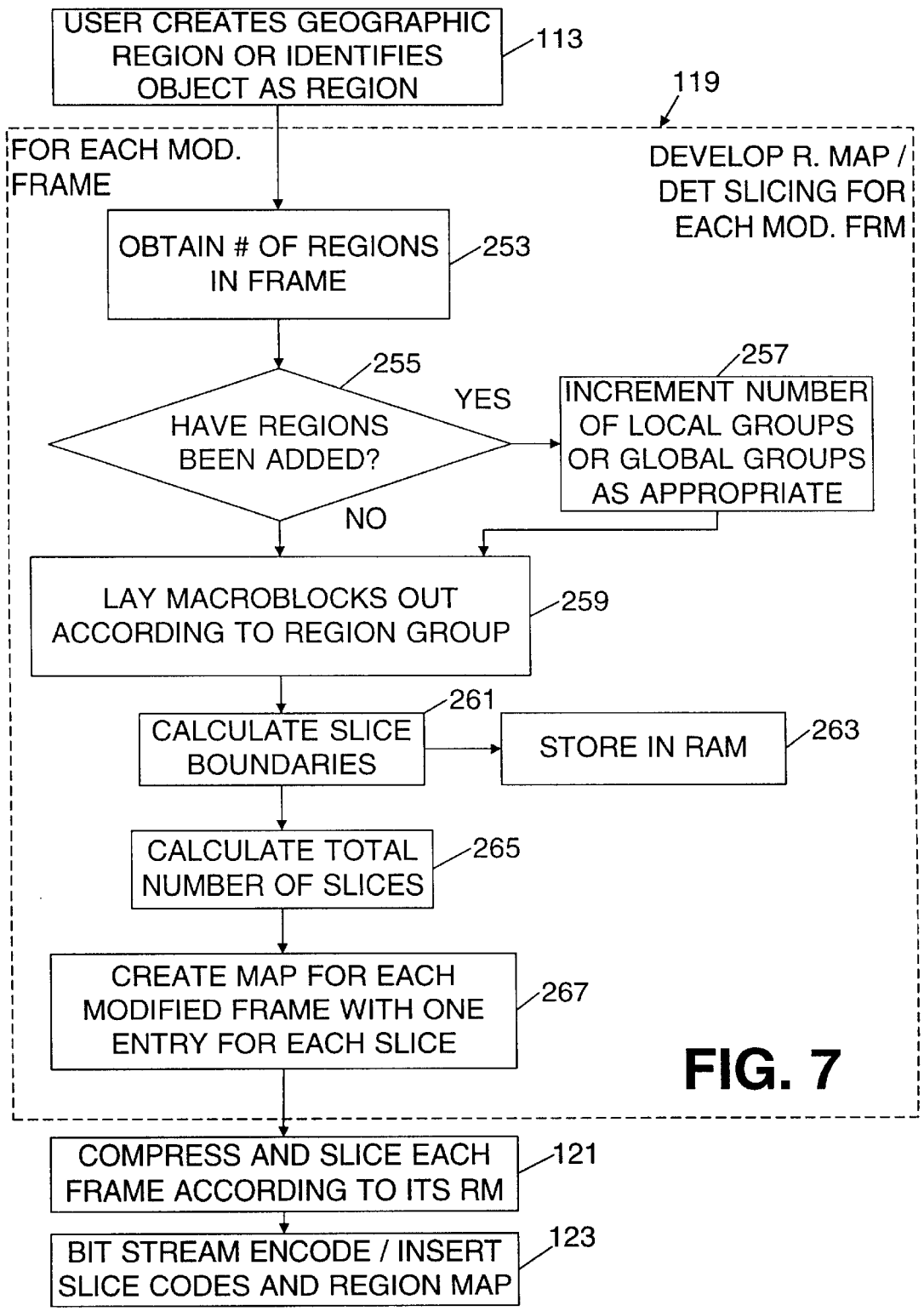

In particular, the software first proceeds to determine for a frame the precise number of regions in the frame; this information is provided by the RAM table discussed above in connection with FIG. 6. The software also determines whether the original video input had ICRs; if so, and if the number of ICRs has been changed, then the software notes this information for the purposes of updating its information as to the number of local region groups and global region groups in connection with the preferred signal format. [As indicated below, in this preferred format, sequence or GOP header information sets forth the total number of region groups for the sequence or single GOP, as appropriate; this information is used to determine region map (table) size for each frame.] The various functions just identified are indicated in FIG. 7 by reference numerals 253, 255 and 257.

The software then determines slice boundaries, using the RAM table information mentioned above in connection with FIG. 6. In particular, the software determines where each image slice should begin and end, and which region each slice should be associated with. The software then calculates a mapping, indexed by region, that identifies each image slice for the frame that must be decoded in order to convert the entire region to the spatial domain; it stores the slice boundaries in RAM for each frame in the sequence and it also stores an indicator of the total number of slices for the frame (which is used for frame header information). These functions, respectively, are indicated by reference numerals 259, 261, 263, 265 and 265. With region information thus available, video may be compressed as necessary in order to generate an output signal.

Compression is performed in a typical fashion, except that unaltered prior compression data from the input signal (if any exists) is re-used if possible; also, motion vector search and compensation is limited such that any resulting motion vectors point do not point outside the pertinent region group. This latter function can be performed in several manners. First, motion search can occur in a normal manner (where a given size search window is scanned to yield an absolute sum of residuals for each "closest match" candidate), except that with each new candidate and before any pixel-based comparison, the search algorithm uses a decision block to determine whether the candidate falls within the region group. If the candidate is outside of the region group, the software discards the candidate and proceeds to the next candidate; if the software finds no possible candidates using this procedure, it simply encodes the block in question without any data dependencies. This operation is preferred, as it is likely the simplest to implement. In the case of fixed-step methodologies, the search algorithm can inhibit step directions that cause the search to more further away from the proper region group as well as any "closest match" selection from outside the region group. The compression software could also build a search window or step strategy around the location of the region group.

The tracking of edits and the re-use of prior motion vector data will now be further described; this task is identified by function block 117 appearing in FIG. 1. In particular, the compression software relies upon tracking of edits and changes (both to the current frame and to the anchor frame) to determine whether prior bit stream data or motion vector data may be re-used in building an output. To this effect, and as generally described by the co-pending patent application referenced above, a "registry of edits" is employed for each edited frame; each time a frame having pre-existing ICRs is decoded, a table is created for that frame with a two-bit value associated with each region of that frame. The table is created only for those frames that have been decompressed for editing or ICR creation, and entries can represent several different types of edits. The absence of a table for a frame that is to be compressed indicates that any prior bit stream data may exactly be passed to the output for a frame. If a table does exist, the software polls the values for its regions to determine appropriate processing.

First, if a region in both (a) a current frame the pertinent anchor frame (or frames) has not been substantively altered (e.g., regions have not been added or redefined), and (b) temporal dependence upon any corresponding region of an anchor frame has also not been severed, then the software may re-use all data for the current region. Otherwise stated, the bit stream data in this case would also be exactly passed to the output signal, although it may be necessary to redo the header information. The values of the registry of edits are initially set to a default (e.g., "00") and are changed as appropriate.

Second, if there has been some adjustment of region boundaries (e.g., re-definition of the existing region or creation of a new region inside an existing region, for either the current frame or any anchor frame), but no change to image content, then the software proceeds on a motion vector-by-motion vector basis. In this regard, a change in region boundaries may or may not invalidate motion vectors of the input signal; the software polls each motion vector to determine whether the motion vector still points within the region group, and performs new search and motion compensation for any motion vectors which cross region group boundaries. Bit stream formation in this event is performed anew for all slices in the adjusted region. This type of editing could be reflected by a binary code such as "11" in the registry of edits.

Third, if image content has been altered in a manner which invalidates any original motion vector data, (e.g., image data has been changed have been changed for the current frame or any pertinent anchor frame such as by signal mixing or logo insertion), then those regions and any associated regions in dependent frames are preferably completely re-compressed from the spatial domain. The system then creates new bit stream data from such re-compressed data for formation of an output signal. To facilitate this processing, at the time of substantive altering of frame content, the software writes another specific value into the registry of edits, specifically for those regions that have been modified; for example, a code such as the binary value "01" could be used for this purpose. The software here also preferably tracks all frames depending upon the modified frame and likewise writes a similar value into these regions.

Fourth, if underlying image content has been altered in a way that does not seriously impact any original motion vectors (e.g., color correction only is performed upon the frame or an anchor frame), it may be possible to re-use the original motion vectors while calculating new residuals. A code such as the binary value "10" could be used for this purpose, and is again written into all depending regions in the same region group.

A "registry of edits" 269 for a single frame is illustrated by FIG. 8, which indicates five hypothetical regions; a first region represents a billboard appearing in the image background (e.g., a billboard for the popular soft drink "COCA-COLA"), a second region represents the bottom right hand screen corner for use in logo insertion, a third region represents an actor's orange shirt (appearing in foreground), and fourth and fifth regions represent remaining foreground and background, respectively. [In this example, it will be assumed that objects always end at a macroblock border; as will be mentioned further below in connection with signal formats, such is generally not the case, and border regions between image objects may themselves be encoded as independent regions.] For purposes of this example, it should be assumed that one desires (a) to modify the "COCA-COLA" wording to instead reflect the corresponding trademark in Chinese, (b) to insert a logo in the bottom right hand corner of the screen, and (c) to color correct the actor's orange shirt to instead be white. In this instance, using the binary codes indicated above, the registry's values might be as indicated in FIG. 8.

Notably, the registry of edits preferably includes some manner of indicating temporal re-ordering of frames (such as might be required for editing of the input video to impart fast-forward, reverse play, and similar effects to the output video signal). This indicator can be a single bit or flag, created for each registry of edits, which is set only if the current frame is a dependent frame whose dependency has been "cut." If there has been such a temporal re-ordering, then the current frame preferably completely re-compressed and re-encoded from the spatial domain. If frame order is simply reversed (i.e., dependency has not been severed), then for "B" frames, motion vectors are simply interchanged (i.e., forward motion vectors become backward motion vectors and vice-versa); if a frame re-reordering affects a "P" frame, the "P" frame is preferably converted to the spatial domain and then is re-compressed, for example, as an "I" frame.

Figure 9:
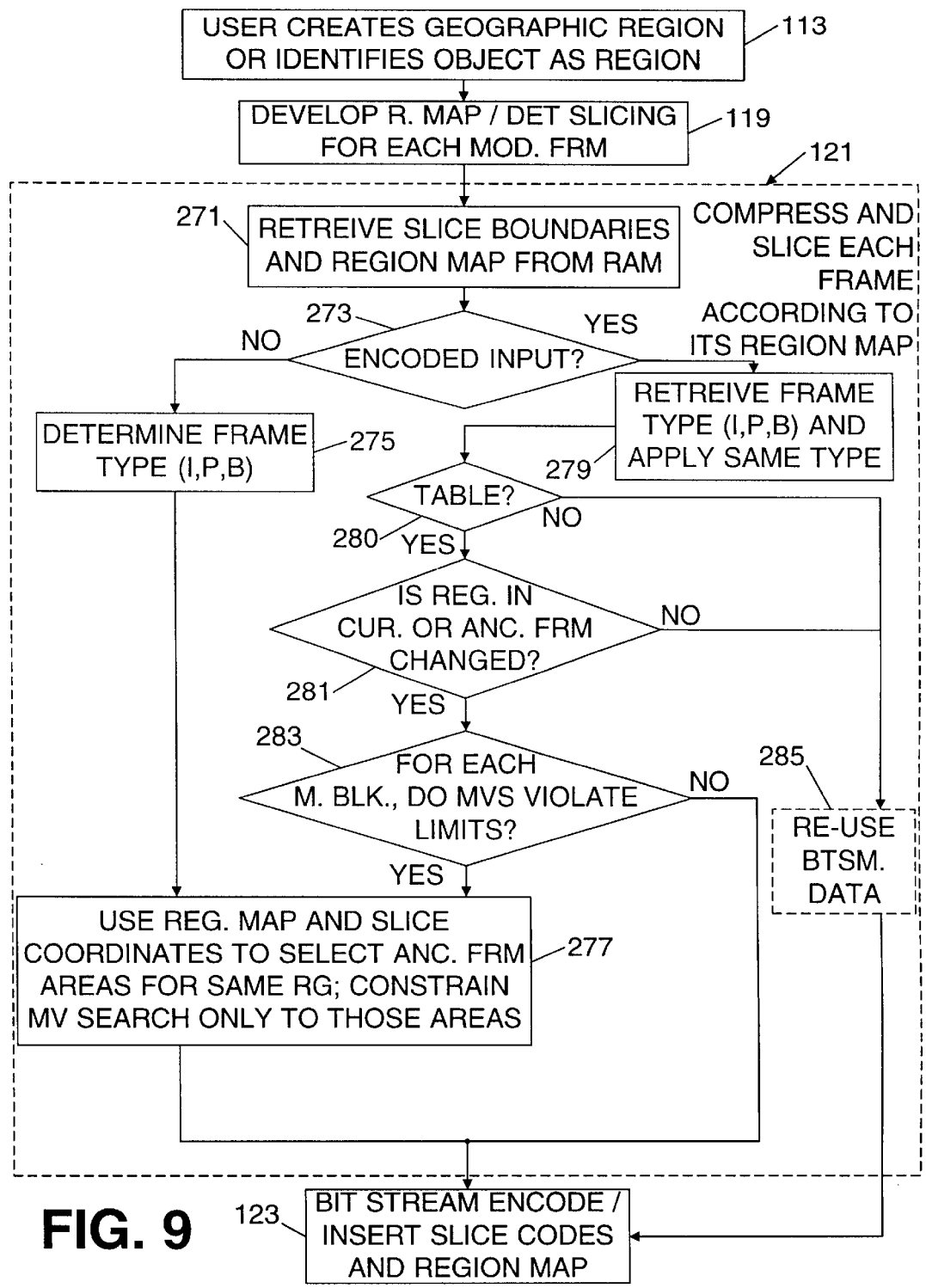

FIG. 9 provides additional detail as to the flow compression algorithm indicated by block 121 of FIG. 1 and of some of the processes just described. For ease of description, FIG.

9 reflects implementation of a device which simply imparts ICRs to input video, and does not provide any editing abilities (other than adjustment of existing regions); an editing device would preferably employ the more plenary set of functions just described.

As seen in FIG. 9, slice boundaries are first retrieved for the current frame from RAM, as indicated by block 271. If the original input video was compressed, then prior compression data is potentially available for re-use; if there is no prior compression data available, then the software proceeds to decide upon a frame type ("I," "P" or "B") and to use the region map and slice boundaries to compress the frame; if the frame type is dependent, then search is limited to point to only corresponding image areas of an anchor frame, as has already been described. These functions are reflected by reference numerals 273, 275 and 277 in FIG. 9.

If prior compression data is available, the software retrieves frame type ("I," "P" or "B") and tentatively applies the same frame type to the corresponding output frame. If no RAM table exists for the frame (the RAM table should indicate frame number, which is used for comparison), the software presumes that there are no changes to the video input and passes original bit stream data directly to the output signal. If a RAM table does exist, the software proceeds on a region-by-region basis, using the table to determine the type of processing. For each region, if there has been (a) no substantive editing (e.g., boundary movement, new region created within, color correction, etc.) in that region and (b) no substantive editing of any anchor frame region for the pertinent region group, then the original bit stream data for the region and its slices are directly used as part of the output video stream. [Since editing of other regions in a frame may affect slice numbering and other header information, frame and slice header information may require adjustment; this adjustment is discussed further below, in connection with the bit stream encoding functions indicated by reference block 123.]

In the context of an encoder/transcoder that simply creates regions (and does not perform editing), any substantive alteration of frame content will simply consist of manipulation of region boundaries; consequently, FIG. 9 indicates that for regions having substantive frame alteration, the software inquires on a motion vector-by-motion vector basis whether region group boundaries are crossed. If the answer to this inquiry is "yes," then motion compensation for the offending data block needs to be re-performed; if not, the motion vectors and associated residuals are passed to the output. These functions are all indicated by blocks 279, 280, 281, 283, 285 and 277. In implementations where the encoder/transcoder will be used to process edited video, it may be necessary to perform further inquiries, such as decision blocks which check for registry values as discussed above to determine whether image content has been altered.

Bit stream encoding is processed in the manner set forth by FIG. 10, which elaborates upon the functions performed by process 123 of FIG. 1. In particular, re-used bit stream data is exactly passed to the output signal if it represents an unaltered frame; this operation is represented by block 287 of FIG. 10. Alternatively, for frame data which is a mixture of original bit stream data (for unaltered regions) and motion vector and residual data (for regions which have been substantively altered as to region definition or image content), the software bit stream encodes the motion vector and residuals data, calculates new slice and frame header data for the frame (including new slice numbering), and ideally passes this data to the output signal; since Huffman coding will be common to the entire frame, it may be necessary to re-code the bit stream data, and the software makes this determination based upon a polling of the new residual data. The software preferably applies some quantization (at the expense of image quality) in order to re-use the original bit stream data, but is also imparted with ability to initiate re-coding of the bit stream data. For frame data which has been completely compressed anew (because input video was originally uncompressed or because of image mixing or logo insertion), such data is completely encoded anew, according to well-known procedures. These functions and the summing together of bit stream frame data are variously indicated by reference numerals 287–311 in FIG. 10, and the final product is an output video signal 313 having ICRs as desired.

With the operation of an encoder and transcoder thus described, several different signal formats will now be discussed.

IV. Use of a Special Signal Format Having Region Maps and Coding Information Pertinent to ICRS.

As discussed above, the present invention can be applied to take video which is "raw," uncompressed data and encode it in an ICR format, and also to take encoded, compressed video and transcode it to an ICR format. This latter operation might be especially useful for already-compressed video which is to be syndicated or distributed for use by a number of different entities; alternatively, it might be desired to transcode video to an independently coded region format if there is a foreseeable need to extract objects from the video. For example, if video is taken of actors against a blue screen background (for "blue-matting" purposes), it normally would be desired to independently code the actors such that they may be readily extracted and mixed with replacement background images.

Video which is compressed with later editing or object extraction in mind is preferably placed into a special signal format that defines each region group and that textually describes each group. The preferred format for this video is explained with reference to FIGS. 11–24. In particular, this format includes special control codes and information which may be inserted into user defined portions of sequence, group of picture (GOP) and frame level header information of a MPEG video sequence. Use of this information enables a decoder or editor to recognize from the compressed image signal itself which slices of an image frame must be decoded in order to edit or extract a select object or location in the screen; more particularly, use of this format enables a decoder or editor to track a region group through multiple frames, even if the relative positions of individual regions in the group change from frame to frame.

Figure 11:
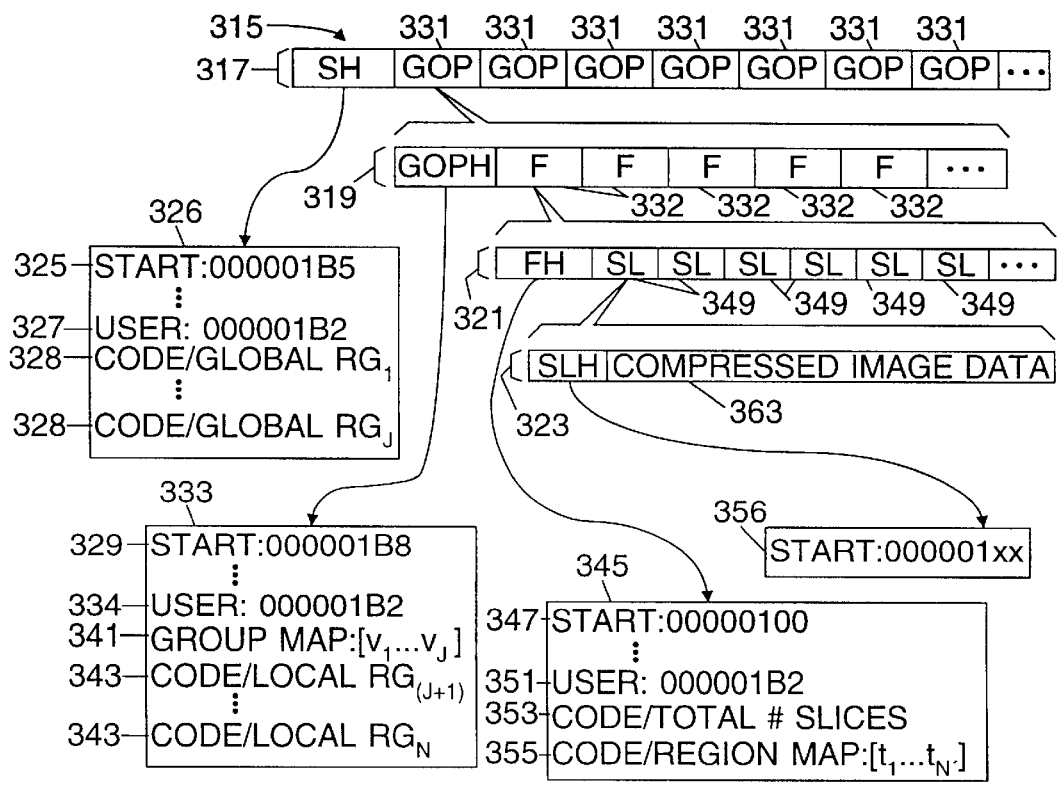
Figure 12:
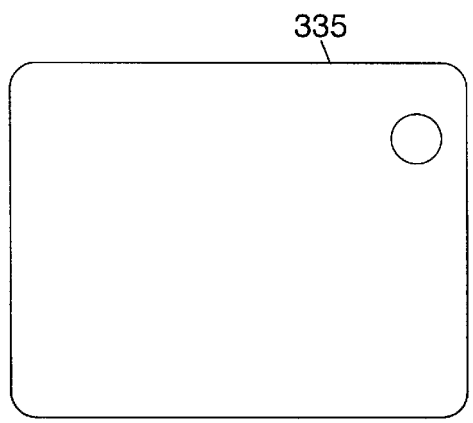
Figure 13:
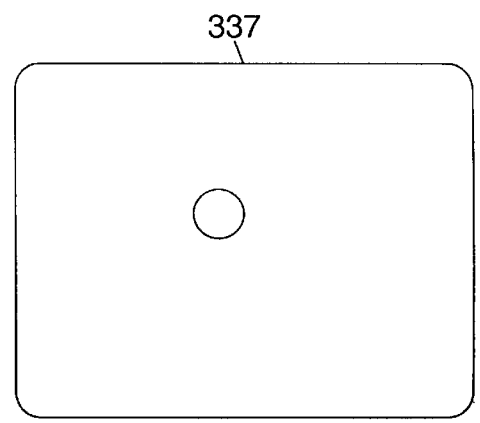

FIG. 11 is used to explain a MPEG sequence and its hierarchy of header information. FIGS. 12–14 illustrate a part of a video sequence including three frames of a flying ball; the ball is seen to move from right to left through these frames. The preferred signal format includes region map information for each frame, indicated using FIGS. 15–20; one region group could be defined as corresponding to the ball, while another region group could be assigned to background not having any ball, and a third region group could be assigned to image portions having both ball and background. Finally, FIG. 24 is used to illustrate the use of a region group dedicated to the lower right hand corner of a television image, for logo insertion.

FIG. 11 shows a MPEG sequence 315, including several tiers of information. In particular, FIG. 11 illustrates a sequence level tier 317, a GOP level tier 319, a frame level tier 321 and a slice level tier 323. In accordance with the preferred embodiment, header information for the first three of these tiers is formatted to include control commands and information that facilitate extraction of ICRs from the video sequence; that is to say, a specific data format is preferably used to facilitate use of ICRs. In the example presented in FIGS. 12–14, it will be assumed that the video sequence is compressed and coded and that it is desired to extract the ball presented by these FIGS. and to change the color of the ball from white to red. Since it is unnecessary to decompress all image data for all frames containing the corrected ball and time consuming to recompress an output signal if a compressed output is desired, an editor or decoder preferably decodes only the region groups containing the ball, and it corrects these region groups only for color. Once editing is complete, the editor or decoder compresses the color corrected region groups and re-inserts these corrected region groups back in place of the original information representing the ball. The editor or decoder can also extract objects in select regions, e.g., the ball illustrated in FIGS. 12–14, for use with other images. Since the ball is seen in FIGS. 12–14 to occupy only a small portion of each image, it should be apparent that the preferred embodiment and preferred data format operate to substantially reduce the processing time that might otherwise be required to produce a compressed, edited output signal.

A "sequence" 315 can be an entire movie or portion thereof and, in the example of FIGS. 12–14, it will be assumed that the sequence includes a great many frames not illustrated. Each sequence includes header information that contains digital parameters used to decode and display images appearing in the sequence; in addition each sequence header contains space for user defined control commands and information. In connection with the preferred signal format, this information (at the sequence level) includes definition of a number of global region groups defined throughout the sequence. For example, if the video sequence represented by FIGS. 12–14 is part of a hypothetical movie about a child soccer player, one global region group could be defined to be a child, while another region could be defined to be a ball. In practice, the global region groups are preferably defined textually (e.g., region 1=ball, region 2=child) within the user defined portions of the sequence header, e.g., using control codes and ASCII text. In this manner, one desiring to edit an image sequence need only examine the electronic header information within the sequence to learn from the signal itself exactly how regions have been independently coded and what these regions represent.

As seen in FIG. 11, the beginning of a sequence in a MPEG format is typically recognized by examining the encoded bit stream and detecting twenty-three consecutive zeros, followed by a "one" and the eight bit sequence "10110101" (in base sixteen numbering, this "sequence start code" value is "000001B5" and is designated by the reference numeral 325). Sequence header information 326 then includes various parameters such as picture size, bit rate, buffer size, video standard, and similar parameters, recognized by control codes that proceed these parameters. A user data start code 327 (twenty-three lead zeros followed by "1B2") is then utilized and followed with special codes defining any global region groups 328. For example, a specific bit pattern (e.g., a code such as twenty-two lead zeros followed by "1100") may be chosen to denote the naming of a global region group, followed by a text comment and another code for naming a second global region group, and so on. FIG. 11 indicates the creation of "j" global region groups 328. Once all user information is complete, a GOP start code 329 can be presented.

In a typical image sequence, a user start code might be followed by many different types of information, such as close captioned information. In the context of an editor operating in conjunction with the present invention, it may be desired to skip this information and proceed directly to region group definition and region map information, and therefore it is preferred to use a coding scheme that renders these types of information readily apparent in examination of an encoded bit stream. One skilled in the art should readily be able to select a coding scheme that permits extraction of region information from among other user data; for example, since MPEG start codes usually commence by twenty-three lead zeros followed by a one, a readily detectable "region information" coding scheme might be twenty-two lead zeros followed by a one, and a binary pattern representing (a) a global region group definition ("100"), (b) a local region group definition ("101"), (c) a total number of slices for the current frame definition ("001"), (d) a group map preamble code ("010"), and (e) a region map preamble code ("011"). These codes could be inserted at the end of any user data already within the image sequence, such that the end of a particular type of region information would be signified by either twenty-two or twenty-three lead zeros (indicating more region information, or another MPEG start code, respectively).

A sequence includes multiple GOPs 331, which typically each have on the order of one dozen to a couple dozen image frames 332. Each GOP is self-contained in the sense that while it typically includes I, P and B frames, no dependent (P or B) frame points outside of the GOP; that is to say, all anchor frames for the GOP are found only within the GOP. Each GOP also contains header information 333, which is recognized by detecting a GOP start code 329 of twenty-three leading zeros followed by the nine bit sequence "110111000" (in base sixteen numbering, this GOP start code is "000001B8"). The GOP header information in connection with the preferred signal format also preferably includes a user data start code 334 ("000001B2") followed by a group map identification code and group map indicating which global region groups are present in the GOP; FIG. 11 indicates that this group map for each GOP includes "j" values, labeled $v_1$ through $v_j$ in FIG. 11.

For example, in FIGS. 12–14, one exemplary GOP is presented consisting of three image frames 335, 337 and 339. If there are only two global region groups in the sequence, and the child is not present in the GOP of FIGS. 12–14, then a group map for this GOP might contain a bit pattern such as the value "10" (seen in FIG. 16), indicating that the first region (the ball) is present in these images, whereas the second region (the child) is not present and consequently will not be represented by individual frames region maps; an exemplary group map 341 is indicated in FIG. 16. The user information for the GOP also includes region group information 343 for locally defined region groups; for example, the GOP of FIGS. 12–14 might include ASCII text information identifying that a third region is a blue sky background to a flying ball, and that a fourth region is a transition between baseball and sky. A locally defined region group, as mentioned earlier, could be signified by twenty-two lead zeros followed by "1101," followed by ASCII text naming the region group. Once the GOP level header information is complete, the bit stream includes a frame start code. The total number of region groups (global and local) is represented by the quantity "N" in FIG. 11.

Returning to FIG. 11, each GOP 331 includes information for multiple image frames, and each image frame includes its own header information 345, defining important parameters such as frame type (e.g., I, P or B). Each frame is commenced by a frame start code 347 (twenty-three lead zeros followed by a one followed by eight trailing zeros, or "00000100" in base sixteen numbering), frame header information and a number of "image slices" 349, which contain the image content for the frame. At this point, the frame start code 347 ("000001B2" in hex) is used, followed by an appropriate code and a definition 353 of a number of total image slices for the frame and by a leading code and region map 355 for the particular frame. The region map identifies which image slices are associated with each region group for the GOP; otherwise stated, the region map indicates "where" a given region may be found in the particular frame. Each slice is also signified via a start code 356, consisting of twenty-three lead zeros followed by 00-AF (hex), indicated a slice number between 0 and 175.

In this regard, it was previously mentioned that the second global region (e.g., a child) is not illustrated in the example of FIGS. 12–14 and, consequently, there are only three regions groups in this GOP, namely, for a ball, a background, and a combination of ball/background respectively. The region maps for each of these frames therefore preferably consist of three tables, one table for each region group in the GOP, each table having one entry corresponding to each image slice in the particular frame. [Because the group map of FIG. 16 indicates that of two global region groups one is present in the GOP while another is not, the first table in the region map will be taken to correspond to the first global region group, and each subsequent table will be taken as corresponding to each locally defined region group, in the order in which they were defined. In this regard, an editor or video processor examining the sequence would be required to keep track of all globally defined region groups as well as any locally defined region groups for the current GOP. This operation is represented by the quantity "N" in FIG. 11, denoting the fact that at least one globally defined region may not be represented in the region map.] As alternative variations to the naming and coding scheme just described, one skilled in the art could implement a different naming or coding scheme and method of tracking region groups in an editor (e.g., instead of having the editor keep track of region group definitions and their order); for example, region groups could alternatively be redefined for each and every GOP.

In the example presented by FIG. 14, it will be assumed that there are nineteen total image slices, such that each table for that frame has 19 one-bit entries. FIG. 15 illustrates hypothetical location of image slices for each of three data types, grouped by position and labeled by the numerals "A," "B" or "C." Data type "A" refers to image data for the ball, data type "B" refers to image data for background scenery, and data type "C" refers to boundary data for image transition from ball to background. Each data type (or box labeled "A," "B" or "C") is encoded using either of two different region mapping schemes discussed below. [Importantly, the MPEG-2 format constrains each subsequent row of image macro-blocks to be encoded as a new slice, such that there will be more slices than nineteen represented in images corresponding to this format; FIGS. 12–23 show only a few slices and regions, and are used for illustration purposes only. Conventionally, each frame in a M.P.E.G. sequence has up to one hundred and seventy-five image slices, which are separately encoded in the bit stream and are signified by slice start code consisting of twenty-three leading zeros, followed by a one, and followed by a two byte value from "1" to "AF" (175). In conventional MPEG formats, there also is a separate layer of commands associated with each macro-block of image data, but the macro-block level of information is not specially used in the preferred embodiment.]

As mentioned, two region mapping schemes are explained each as applied to FIG. 15. In a first region mapping scheme (represented by FIGS. 17–19), each data type "A," "B" and "C" are individually encoded as a separate region group. Using this mapping, for example, if one desired to extract a ball only from a compressed representation of FIG. 15, one would need to identify and decode both regions "A" and "C," which would include ball data. In a second region mapping scheme (represented by FIG. 20), only two region groups are used. A first region group is identified to include data from any image slices having a ball (e.g., any slice having data types "A" or "C"), whereas a second region group is identified to include data from any image slices having background (e.g., any slice having data types "B" or "C")

FIG. 16 illustrates a hypothetical group map 341 in this "flying ball" example, while FIGS. 17–19 illustrate the individual tables 357, 359 and 361 for the first region mapping scheme mentioned above. In particular, FIG. 17 identifies that, of nineteen image slices indicated in FIG. 15, only the eleventh slice has data belonging to this region (e.g., parts of the image having only a ball without any background). FIG. 17 indicates that of the nineteen slices, all but the seventh, tenth, eleventh, twelfth and fifteenth images slices have only blue sky background; finally, FIG. 19 indicates that the seventh, tenth, twelfth and fifteenth slices have both ball and background. One desiring to perform color correction (for example) upon the ball in this frame would need to decode all of the regions identified by the tables of FIG. 17 and 19 in order to find all image data corresponding to the ball, but would not need to decode any parts of the image frame representing purely background.

The signal format includes not only the header information discussed above, but also contains compressed image data for ICRs themselves. Each region group, for example, the three region groups scheme for each of "A," "B" and "IC" in FIG. 15, require limitation during motion search, such that motion vectors and residuals for data within these regions point only to corresponding regions in a prior frame. For example, FIG. 15 represents the third frame in the hypothetical three-frame GOP of FIGS. 12–14, whereas FIG. 21 represents the first frame, seen in FIG. 12, where the ball is at the upper right side of the image frame. If it is assumed that the frame of FIG. 15 represents a dependent "P" frame, whereas FIG. 21 represents an independent "I" frame (as it must be if FIGS. 12–14 represent a GOP), then the motion search limitation would constrain all motion vectors in a region for "A" data in FIG. 15 to point only to corresponding region having "A" data in FIG. 21. Similarly, all motion vectors in any region having "B" data in FIG. 15 would be constrained to point to within any corresponding region having "B" data in FIG. 21, and all motion vectors in any region having "C" data in FIG. 15 would be constrained to point only to within any corresponding region having "C" data of FIG. 21. This mutual independence, i.e., the limitation that data from outside a region group cannot have motion vectors and residuals pointing into the region group, is relatively important, since without this limitation, changing data in a region group of interest might invalidate motion vector and residual data from (another frame) outside the group. The motion vector and residual data contained within the image slice data (represented by the reference numeral 363 of FIG. 11) of the preferred signal format, would be formatted in accordance with these limitations.

FIGS. 22 and 23 illustrate the two region mapping schemes discussed above as applied to the hypothetical frame of FIGS. 12 and 21. In particular, FIG. 22 illustrates the three-region scheme, where all region tables have now been combined into a single matrix 365 and illustrated as consecutive rows of data (each row is a region table). Since FIG. 21 presents an exemplary case of only eighteen image slices, header information for the frame of FIG. 21 will indicate a total number of slices (18) and software interpreting the region map information will use eighteen one bit entries for each table. FIG. 23 illustrates the second region mapping scheme, where a matrix 367 of only two tables are used, one for data types "A" or "C" and one for data types "B" or "C". As with this region map also, only eighteen entries are used, one for each image slice. As indicated, some MPEG image signals require that a new slice begin for each row of macroblocks and, thus, a real example would typically have many more slices than eighteen or nineteen.

As can be seen from the foregoing, the beginning of a sequence, GOP, frame or slice can be recognized directly from an encoded bit stream. Similarly, all information relevant to ICRs is stored in header information, such that a distributed video includes within its digital control information sufficient data to permit recognition, decoding and extraction of image objects or locations from a signal which has been specially formatted for independently coded regions. In an application involving logo insertion, for example, the encoder (and the associated GOP and region maps) could be defined to always separately slice the bottom right hand corner of an image screen, and to define that corner as a global region group. In performing logo insertion, an editor would simply need to monitor the encoded bit stream to (a) determine the identify of the global region group corresponding to the bottom right corner, e.g., the global region group named "LOGO," (b) extract from each frame of each GOP having this global region group the table of the region map corresponding to the proper global region group, and (c) decode each image slice identified by the table. Logo insertion is then performed, with the modified image data being subjected to new motion estimation and compensation and encoded and inserted into the original bit stream, in place of the data which has now been modified. Since each region group is mutually independent of each other region group, re-insertion of modified data will not affect any other region group for the any image frame. Finally, if the modified data results in any change of bit rate or buffer information, it may be necessary modify the bit rate or buffer size for the particular frame or GOP.

FIG. 24 illustrates an image frame 369 where the bottom right hand corner 371 is reserved for insertion of an image or logo 373, such as a local television station logo "TV5" depicted in FIG. 24. In this regard, if it is desired to produce an encoded, compressed video signal for distribution and subsequent, localized logo insertion, a small rectangular region is preferably defined at a constant location for all image frames in a sequence. For example, in a sequence header, a global region group could be defined and textually explained to be a bottom-rightmost rectangle of sixty-four pixels wide and thirty-two pixels high (e.g., four macro-blocks wide by two macro-blocks high), such as a corner area designated by the reference numeral 371 in FIG. 24. Each frame's region map would in that event contain a table expressly listing slices containing only the last four macro-blocks of the last two lines (of macro-blocks) as belonging to this region group.

Importantly, the signal formats discussed above are not the only way to independently code regions, and need not exclusively be applied to video or other image signals. For example, MPEG techniques are often applied to audio signals, and the use of independently coded regions to permit select feature extraction from a compressed signal could be applied to audio signals. Furthermore, use of a "region map" is not the only way to convey the location of independently coded regions; Information on region naming could be distributed by a mechanism other than text contained within the signal itself. As an example of this latter point, textual definition of region groups could be effected by printed text such as in a manual. In addition, a group map or region map is not necessary for many applications of independently coded regions; for example, in a logo insertion application, it could simply be "understood" that the last image slice would represent a fixed area of independent coding; an editor would not need to extract any mapping information, but could simply be programmed or operated under a user's control to extract and decode this image slice only.

With preferred examples of a signal having embedded region information thus explained, editing applications and uses for independently coded regions will now be explained in greater detail; as indicated, the processes described below should be assumed to be operable upon any compressed signal having independently coded regions, irrespective of whether the signal complies with the preferred format just described.

V. Contemplated Editing Applications.

As mentioned, the techniques described in this disclosure may be used in various parts of the film and video process; the techniques may be used in originally capturing an image sequence, or for processing a previously captured sequence. The techniques may be used by a post-production or editing house, in connection with a film transfer (such as a telecine process) or in-Internet broadcast video, satellite distribution or other parts of the program distribution process.

The techniques described in this section presume that an ICR signal has already been created and is provided as an input; a video output will also generally be an ICR signal, but will reflect some sort of editing performed upon it to take advantage of the efficiencies imparted by ICRs.

FIG. 25 shows use of an ICR signal for logo insertion (for example, by a local television station). An original compressed, ICR video signal is designated by reference numeral 375 in FIG. 25, and is graphically depicted by a nondescript image screen 377. It is desired to substitute a logo or other static image 379 into a predetermined geographic location of one or more frames of the ICR signal.

The system first begins by selecting the appropriate ICR that is to be combined with the logo; since the video input is assumed to already have ICRs for this purpose, the appropriate ICR is preferably automatically detected. [Automatic detection is performed either by causing system software to recognize a predetermined global region group name, e.g., "LOGO," or by having the user of editing equipment otherwise identify the region group space to be used for the insertion.] With the region selected, the software converts the selected region group to the spatial domain, as indicated by function block 381. Importantly, this extraction is preferably performed directly from the encoded bit stream and, then, only upon the region group of interest. As indicated by function block 383, other regions and image data for the sequence will remain in compressed format; this result is graphically depicted by a nondescript image screen 385 having its right bottom corner 387 missing (corresponding to a decoded logo region). Correspondingly, the right side of FIG. 25 indicates the presence of spatial domain regions at reference numeral 389, as further depicted by an enlarged right bottom image screen corner 391.

The logo or other image is then combined with the decoded, spatial domain data. Typically, the logo image will correspond exactly in size and configuration to the image area with which it is to be combined; if such is not the case, the logo image preferably is configured as an image that does meet this criteria. The statial domain image data and logo image data are then combined using an opacity measure "α," as indicated by reference numerals 393, 395 and 397. This opacity measure determines whether the logo itself will be opaque or translucent. The variable α will typically be zero for all non-logo data, such that the original image (which is weighted by 1−α) will be unaffected in areas not overlapped by the logo. With this image combination having been performed (typically for an entire GOP at a time), new motion search and compensation is performed (if appropriate, using original frame type) for the new, modified spatial domain data. This data is then bit stream encoded to take the place of image slices which were decoded to the spatial domain for the editing process, and the two. signals are added together; these processes are variously indicated by reference numerals 399, 401 and 403 of FIG. 25. If appropriate (e.g., the new data has a different compression statistics), the software adjusts buffer size and bit rate parameters for the frame or GOP in a conventional manner, as indicated by block 405. The output of this process is a compressed video signal 407 which now includes the inserted logo, and where editing was performed without decoding the entirety of each and every frame to the spatial domain. This new signal is depicted in FIG. 25 by an image screen 409 having a cross-hatched lower right corner.

Figure 26:
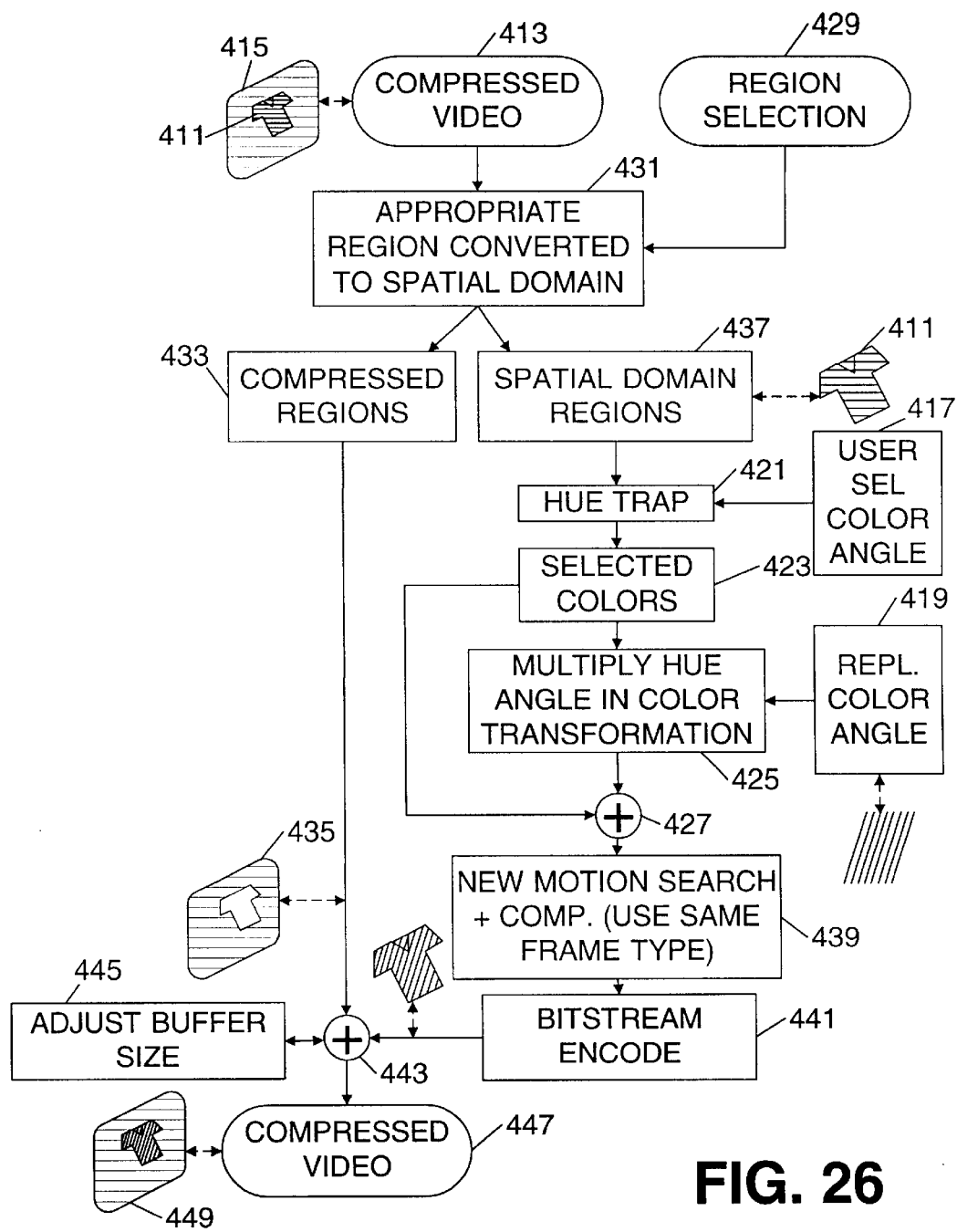

FIG. 26 relates to use of ICRs in color correction. In particular, it is not uncommon for television programs or movies to be "shot" under and expectation that certain colors will be replaced (during editing) with colors which are more pleasing to the eye. With reference to FIG. 26, it should be assumed that an actor's shirt or torso 411 has been previously defined as an ICR. The process indicated by FIG. 26 might be performed in a post-production house.

FIG. 26 shows an input of compressed video 413, with a screen 415 pictorially depicting that video; the screen shows the shirt 411 as including one or more particular colors which are collectively denoted by a horizontal-line pattern. It is desired to correct one or more of these hypothetical colors to a different color or colors.

Prior to discussing color correction in the context of ICRs, it might first be helpful to describe a digital color correction process in general. To this effect, as is common in color correction systems, a user of an editing system will supply a color selection angle as well as a replacement color angle, as indicated by boxes 417 and 419. The color selection angle represents a hue arc (in polar coordinates) that is to be selected for replacement; there are many other mechanisms for selecting colors such as other color plane-based functions (Y-B, Y-R)as well as non-color plane-based functions. A hue trap 421 identifies specific image pixels which do not fall within the color selection angle, and these pixels are not processed for color correction. Pixel colors 423 falling within the color selection angle are subjected to a transform 425; the transform is defined by the replacement color angle.

To take a simplified example of how this color correction operates, it should be presumed that the shirt 411 has three colors, including white, light red and dark red. The color selection angle 417 might indicate that all reds are to be replaced; further, the replacement color angle 419 might be a narrow range of blues, for example, very light blue to sky blue. In this example, the transformation might result in a wide range of reds being converted to a narrow range of light blues; otherwise stated, the shirt after processing would emerge as white, very light blue, and sky blue in color, with the very light blue replacing the light red and the sky blue replacing the dark red.

Pixels that are color-transformed are then mixed back into the original pixel data via a summing junction 427, to create new image data.

In the context of ICRs, the color correction process operates very similar to the manner just described for logo insertion. In particular, as indicated by block 429 of FIG. 26, a user designates a specific region or regions that are to be the subject of color correction; these regions will be decoded to the spatial domain from the compressed bit stream (as indicated by block 431), while other regions will remain compressed. Here again, the compressed regions are designated at the left side of FIG. 26 by a block 433 and a picture of an image screen 435 with a blank spot, symbolizing removal of a region for color correction. Similarly, the right side of FIG. 26 indicates the presence spatial domain regions 437 and a picture of the shirt 411, symbolizing removal of the appropriate region. The shirt is processed for color correction, and new motion estimation and compensation (per reference block 439) is performed on the color corrected region; the results are bit stream encoded, as indicated by block 441. The resulting two compressed bit streams are then mixed together via a summing junction 443, and frame buffer size and bit rate parameters adjusted if necessary (see, e.g., reference block 445). Finally, the result of the color correction process is a compressed video bit stream 447 that represents color corrected video, depicted by a screen 449 having the color corrected shirt.

Figure 27:
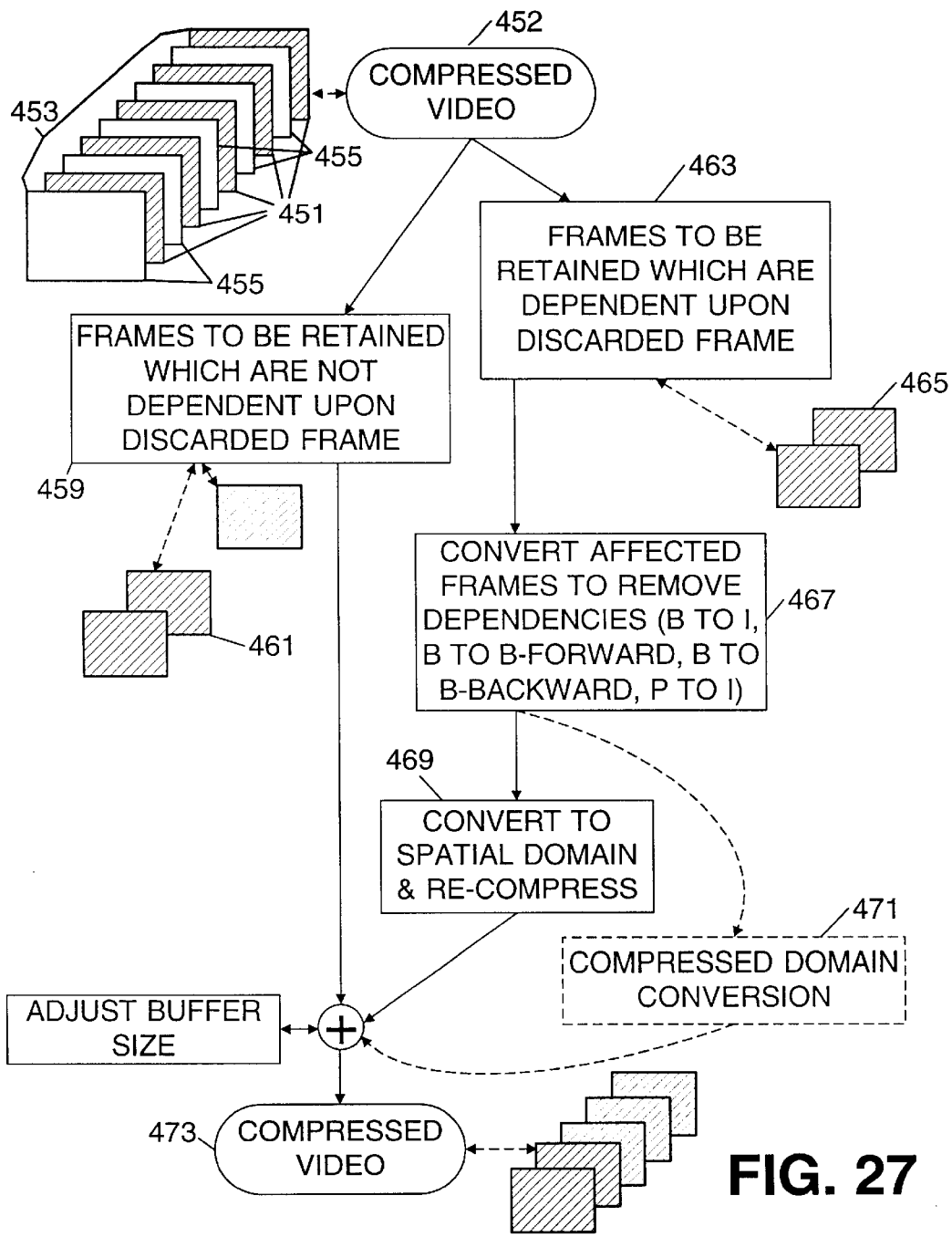

FIG. 27 is used to explain fast forward and fast backward functions. While there are many ways of imparting these functions, FIG. 27 shows a process where frame speed is increased by a multiple "Q" via dropping frames and retaining only every "$Q^{th}$" frame. In FIG. 27, it is to be assumed that frame speed is to be doubled, and consequently, that only even frames 451 will be retained, and that the video 452 will carry with it a constant, unchanged frame rate. The processes described by FIG. 27 may be applied in conjunction with an ICR signal, particularly where it is desired to take a first image sequence and mix or substitute a second image sequence into one or more regions of the first image sequence. This function will be discussed further below, in connection with FIG. 29.

The left side of FIG. 27 pictorially shows a sequence 453 of ten frames, half of which 455 are not shaded (and are to be dropped) and half of which 451 are shaded and are to be retained. It should be assumed that some of the frames to be retained depend upon anchor frames which are being dropped; for proper video decompression and reconstruction, these frames need to be segregated and processed during the fast forward or fast reverse process to remove the severed dependency. In FIG. 27, reference numerals 459, 461, 463 and 465 are used to denote this segregation.

To remove severed dependencies, "B" frames are converted to "I," "B-forward" or "B-backward frames, depending upon whether any anchor frames are retained; "P" frames are converted to an independent format. This conversion preferably occurs by completely decompressing the frame of interest to the spatial domain, and then re-compressing it in the desired format. Alternatively, a method exists for performing this processing in the compressed domain, as suggested in U.S. patent application Ser. No. 09/069,596 for "System for Editing Compressed Image Sequences," filed on Apr. 29, 1998 on behalf of inventors Susie J. Wee and Bhaskaran Vasudev which is hereby incorporated by reference. These conversion processes are variously indicated in FIG. 27 by reference numerals 467, 469 and 471. Once compressed bit stream data is available for the converted frames, it is again mixed with bit stream data for the unmodified frames to form a compressed video output 473.

Figure 28:
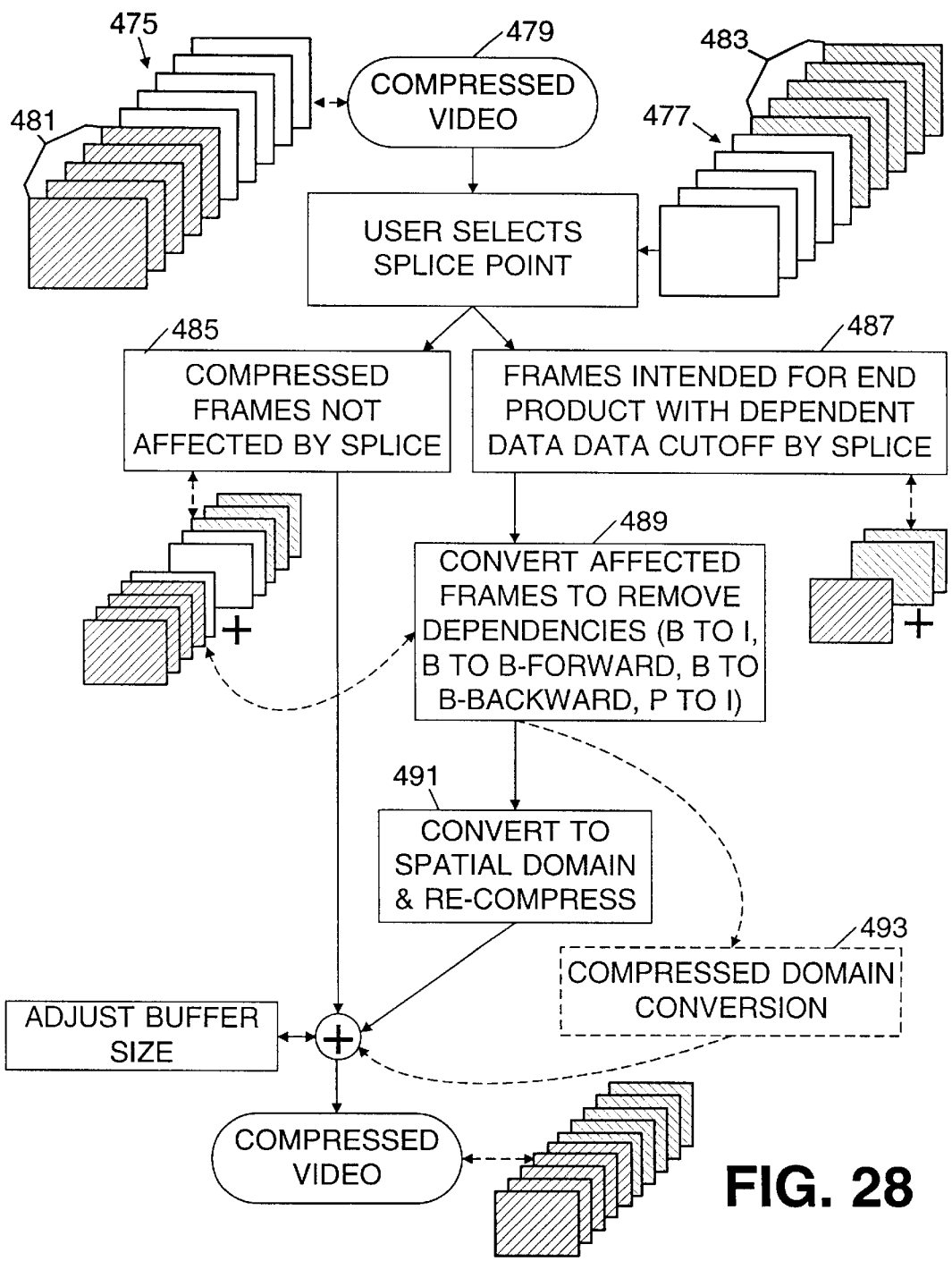

FIG. 28 also illustrates a process that is not specific to ICR signals, namely, the splicing of two image sequences together. A first image sequence 475 is illustrated at the left side of FIG. 28, while a second image sequence 477 is illustrated at the right side of FIG. 28. The first image sequence forms the original, compressed video input 479, and the user selects a splice point for each sequence. Because this splice point may result in severance of one or more dependencies (upon an anchor frame), it is necessary to first convert affected frames to remove the affected dependencies. To this effect, FIG. 28 pictorially illustrates in diagonal hatching frames to be retained 481 and 483 from each of the first and second image sequences, as well as retained frames not affected by the splice 485 and retained frames which are affected by the splice (designated by reference numeral 487). As with the process just described above, dependencies are removed by converting "B" frames to independent, "B-forward" or "B-Backward" frames as appropriate, and by converting affected "P" frames to "I" frames, in either the spatial or compressed domains (see, e.g., blocks 489, 491 and 493 of FIG. 28).

Reverse play functions may be imparted by simply reordering frames in the compressed domain and by performing the conversions just described. "B" frames, however, do not need conversion, but simply some changes to header information to indicate that forward motion vectors become rearward motion vectors and vice-versa.

Figure 29:
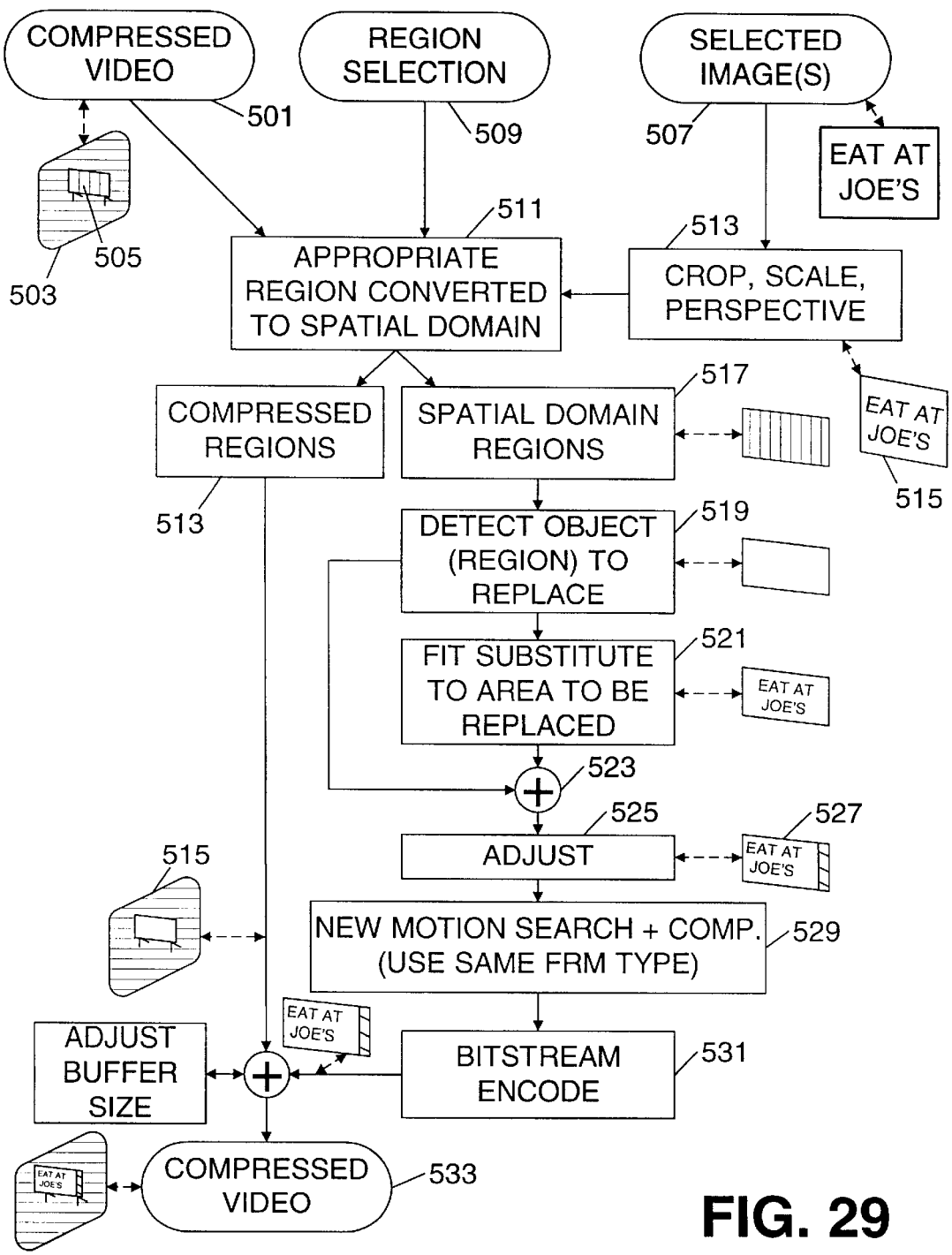

With this processing background in mind, usage of these and other functions will now be described in the context of an ICR signal, and is explained with reference to FIG. 29. In FIG. 29, a compressed video input is designated by the reference numeral 501 and a graphic 503 showing a billboard 505. In this example, it should be assumed that the billboard has been independently coded and that it is desired to replace the billboard with either a new, second image or entire image sequence 507 that may play at the same rate or a different rate as the compressed video input. To take one example of this process, it might be desired to replace an English language sign (for example, appearing as an advertisement in the background of a soccer game) with a Chinese language equivalent. Alternatively, it might be desired to splice a new video image into existing image frames for the billboard, or to reverse or change the play speed of new video intended for the billboard.

As seen in FIG. 29, the system receives the compressed video sequence 501 together with region selection information 509 from a user. The region selection information will be used to cause the decoding of a subset of regions in the compressed video sequence, as indicated by block 511. The remaining regions are not compressed and preferably remain in bit stream format as indicated by block 513 and a screen pictograph 515 (with the billboard region symbolized as missing).

The second image or sequence 507 is modified as desired by the user; preferably, the software affords the user the opportunity to view the second image or sequence overlaid upon the first image, and to crop, scale and change the perspective of the second image. Accordingly, the second image or sequence is adjusted by the user to be roughly compatible with its destination within the video input, as indicated by reference numerals 513 and 515. The software takes the second image or sequence and maps that information as modified by the user to the dimensions of the decoded spatial regions, and fits substitute image data into the original regions of the video input (or at least within a selected object of the original regions). Preferably, the user is afforded the opportunity (via visual display, zoom and a user interface such as a mouse) to further crop the substitute image data, or to make that data translucent over the original image data. The software also preferably affords the user menu functions to fit accelerated or decelerated display of the second image (sequence) with respect to the original image data (e.g., via frame dropping), or to reverse play of the second image (sequence) with respect to the video input, or to splice several image sequences together to form replacement image data for a region. These functions are indicated by reference numerals 517, 519, 521 and 525.

The lower right side of FIG. 29 contains a pictograph 527 which illustrates the edited data or sequence that is intended for substitution back into, and mixing with, the compressed video input. This data is subjected to new motion estimation and compensation and bitstream encoding, as indicated in FIG. 29 by numerals 529 and 531. The data is encoded in discrete image slices to take the exact position of those image slices which represented the original billboard. FIGS. 533 and 535 represent the final video output which mixes both regions.

VI. Conclusion.

Importantly, those skilled in video, television and similar fields will recognize that modifications may readily be performed to the embodiment stated above without departing from the principles of the present invention. For example, while the use of a specific M.P.E.G.-2 encoder and transcoder has been described, it is possible to design other devices operable with other video or audio standards to take advantage of ICRs. It may be possible to use other signal formats and other ICR naming schemes.

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. An improvement in a representation of a signal, the signal representing at least two data frames in compressed format, the frames including an anchor frame and a dependent frame that depends upon the anchor frame for its reconstruction, the compressed format for the dependent frame including motion vectors and residuals that enable recreation of data blocks in the dependent frame from data blocks in the anchor frame, said improvement comprising:

defining first and second regions in the anchor frame which have mutually exclusive subsets of anchor frame data;

defining first and second regions in the dependent frame which have mutually exclusive subsets of dependent frame data;

constraining the motion vectors during compression of the dependent frame such that motion vectors for the first region of the dependent frame are limited to point into the first region of the anchor frame but not into the second region of the anchor frame, motion vectors for the second region of the dependent frame are limited to point into the second region of the anchor frame but not into the first region of the anchor frame; and indicators observable from the compressed format for at least the dependent frame which mark the location of portions of the compressed format that relate to the first region of the dependent frame, and that mark portions of the compressed format that relate to the second region of the dependent frame, such that either of the first and second regions can be separately extracted from the compressed format and decompressed without any need to decompress non-corresponding regions of the anchor frame.

2. An improvement according to claim 1, wherein each frame represents video image data.

3. An improvement according to claim 1, wherein:

the representation is embodied as a compressed bit stream;

the indicators are observable from examination of the compressed bit stream, and separately mark portions of the compressed bit stream that relate to the first and second regions of each of the dependent frame and the anchor frame;

the signal is adapted to permit selective extraction and spatial domain reconstruction of the first region of each of the dependent and anchor frames without any need to extract or decompress either of the second region of the dependent frame and the second region of the anchor frame, and selective extraction and spatial domain reconstruction of the first region of each of the dependent and anchor frames without any need to extract or decompress either of the second region of the dependent frame and the second region of the anchor frame.

4. An improvement according to claim 3, wherein the indicators include slice start codes.

5. An improvement according to claim 3, wherein the indicators include entries in a region map for each frame that are adapted to permit association of corresponding regions across multiple frames and to identify position of individual regions within each frame.

6. An apparatus comprising a signal stored on machine readable media, the signal characterized by:

at least two data frames in compressed format, the frames including an anchor frame and a dependent frame that depends upon the anchor frame for its reconstruction, the compressed format for the dependent frame including motion vectors and residuals that enable recreation of data blocks in the dependent frame from data blocks in the anchor frame;

wherein the anchor frame has associated with it first and second regions in the anchor frame which have mutually exclusive subsets of anchor frame data;

wherein the dependent frame has associated with it first and second regions in the dependent frame which have mutually exclusive subsets of dependent frame data;

wherein the motion vectors for the dependent frame are constrained such that motion vectors for the first region of the dependent frame are limited to point into the first region of the anchor frame but not into the second region of the anchor frame, motion vectors for the second region of the dependent frame are limited to point into the second region of the anchor frame but not into the first region of the anchor frame; and indicators in the signal for at least the dependent frame which mark portions of the signal that contain compressed data for the first region of the dependent frame, and that mark portions of the signal that contain compressed data for the second region of the dependent frame, such that either of the first and second regions can be separately extracted from the signal and decompressed without any need to decompress non-corresponding regions of the anchor frame.

7. An apparatus according to claim 6, wherein the signal is a video signal representing plural image frames.

8. An apparatus according to claim 6, wherein:

the signal is a compressed bit stream;

the indicators are observable from examination of the compressed bit stream, and separately mark portions of the compressed bit stream that relate to the first and second regions of each of the dependent frame and the anchor frame;

the signal is adapted to permit selective extraction and spatial domain reconstruction of the first region of each of the dependent and anchor frames without any need to extract or decompress either of the second region of the dependent frame and the second region of the anchor frame, and selective extraction and spatial domain reconstruction of the second region of each of the dependent and anchor frames without any need to extract or decompress either of the first region of the dependent frame and the first region of the anchor frame.

9. An apparatus according to claim 8, wherein the indicators include slice start codes.

10. An apparatus according to claim 8, wherein the indicators include entries in a region map for each frame that are adapted to permit association of corresponding regions across multiple frames and to identify position of individual regions within each frame.

11. A product-by-process, said product comprising a compressed image sequence stored on digital storage media wherein the image sequence includes at least one image frame representing a single visual image, the single visual image being subdivided into two independently coded regions, such that each region may be extracted and decompressed from the compressed image sequence without extracting and decompressing the other region, said product formed by a process that includes selecting within a single image frame one of a geographic area and an image object that is to be independently coded, and compressing the one such that motion vectors for any dependent frame are constrained to point only to the same object or geographic area of any anchor frame, and by encoding the one as a subset of substantially non-overlapping image slices that may be independently recognized and extracted from the compressed image sequence.

12. A product-by-process according to claim 11, wherein the process includes encoding the one of a geographic area and an image object as a first independently coded region, and encoding all other data appearing in the same image frame as a second independently coded region, wherein dependent frame motion vectors for the one are constrained to point to reference data representing the same area or object in an anchor frame, and wherein dependent frame motion vectors for the second independently coded region are constrained to not point to reference data representing the same area or object in an anchor frame.

13. An apparatus comprising a compressed image sequence stored on digital media, wherein the image sequence includes at least two independently coded regions, where both independently coded regions are represented together in at least one frame of the image sequence encoded as a single data stream representing the at least one frame, the independently coded regions each adapted for select extraction and decompression from the compressed image sequence in mutually independent fashion by extracting and decoding image slices corresponding to the selected independently coded region from the compressed image sequence.

14. A product-by-process according to claim 11, wherein:
the compressed image sequence stored on digital storage media is a compressed bitstream having a plurality of substantially non-overlapping image slices from each frame, each image slice separately detectable from the compressed bitstream; and
the image slices are formed from motion-compensated blocks of data, where each motion-compensated block corresponds to an independently coded region, and a new image slice is initiated when a next motion-compensated block to be encoded represents a different independently coded region from an immediately prior motion-compensated block.

15. A product-by-process according to claim 14, wherein the compressed image sequence is MPEG-2 compliant.

16. An apparatus according to claim 13, wherein each image slice is formed from one or more motion-compensated blocks of data, where each motion-compensated block corresponds to an independently coded region, and a new image slice is begun each time a next motion-compensated block to be encoded represents a different independently coded region from an immediately prior motion-compensated block.

17. An apparatus comprising a signal stored on machine-readable media, wherein:
said signal includes a compressed bitstream representing at least one video frame;
the compressed bitstream is formatted as a series of substantially non-overlapping image slices for each video frame, with each image slice adapted for independent detection and extraction from the compressed bitstream; and
said signal includes at least two regions that are independently encoded, with any image slice representing compressed image data for one region only, such that each region may be independently decoded from the compressed bitstream via decoding of a subset of image slices for each frame.

18. An apparatus according to claim 17, wherein said signal includes at least one dependent frame having motion compensation information with respect to an anchor frame, the motion compensation information for a given image slice of a dependent frame limited to refer only to reference data associated with the same region in a corresponding anchor frame.

19. An improvement in a compressed representation of a video signal stored on machine-readable media, where motion vectors and residuals that enable recreation of data blocks in a dependent frame from data blocks in an anchor frame, said improvement comprising:
at least two regions where motion compensation for each region is limited so as to refer to only reference data associated with the same region in the same frame or an anchor frame; and
image slicing in the compressed representation, such that each image slice includes encoded video information for a single region only;
wherein each image slice is adapted for selective extraction from the compressed representation, such that each region can be independently decoded from the compressed representation.

20. An improvement according to claim 19, further comprising mapping observable from the compressed representation that identifies a subset of slices associated with each region, such that each region may be separately extracted from the compressed representation without necessarily extracting all data for other regions by decoding only those image slices identified by the mapping as belonging to a particular region.

* * * * *